United States Patent
Morita

(10) Patent No.: US 9,891,408 B2
(45) Date of Patent: Feb. 13, 2018

(54) MIRROR DRIVE DEVICE THAT MOVES MIRROR HOLDERS AND IMAGE PICKUP APPARATUS

(71) Applicant: CANON KABUSHIKI KAISHA, Tokyo (JP)

(72) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/373,751

(22) Filed: Dec. 9, 2016

(65) Prior Publication Data
US 2017/0168263 A1    Jun. 15, 2017

(30) Foreign Application Priority Data

Dec. 14, 2015 (JP) .................. 2015-242912
Dec. 14, 2015 (JP) .................. 2015-242913

(51) Int. Cl.
*G02B 7/182* (2006.01)
*H04N 5/225* (2006.01)

(52) U.S. Cl.
CPC ......... *G02B 7/1821* (2013.01); *H04N 5/2254* (2013.01)

(58) Field of Classification Search
CPC ........ G02B 7/1821; G02B 7/08; G02B 5/208; G02B 7/198; H04N 5/2254; G03B 19/12
USPC .......................................... 359/850
See application file for complete search history.

(56) References Cited

U.S. PATENT DOCUMENTS

2013/0136441 A1*  5/2013  Yamada ................. G03B 19/12
                                                        396/447

FOREIGN PATENT DOCUMENTS

JP       2006-030498 A     2/2006
JP       2010-044271 A     2/2010

* cited by examiner

*Primary Examiner* — Euncha Cherry
(74) *Attorney, Agent, or Firm* — Cown, Liebowitz & Latman, P.C.

(57) ABSTRACT

A mirror drive device that eliminates the need of an additional driving source for releasing a mirror from a locked state, and achieves power saving, lower cost, and size reduction thereof. When a main mirror holder and a sub mirror holder rotatably attached thereto are in respective mirror-down positions, cams of a cam gear and a mirror drive gear that moves the sub holder are in contact to restrict movement of the mirror drive gear. When the holders are between the mirror-down position and a mirror-up position, gears of the cam gear and the mirror drive gear are in mesh for moving the sub holder. When the sub holder is moved from the mirror-down position to the mirror-up position, the sub holder is brought into contact with the main holder to push and move the main holder from the mirror-down position to the mirror-up position.

13 Claims, 26 Drawing Sheets

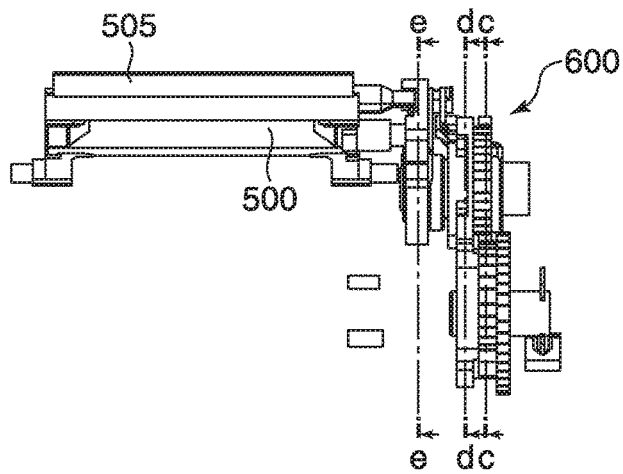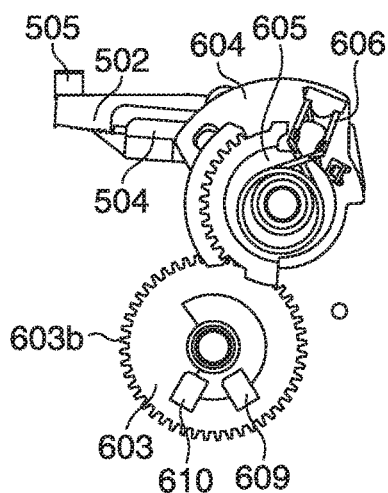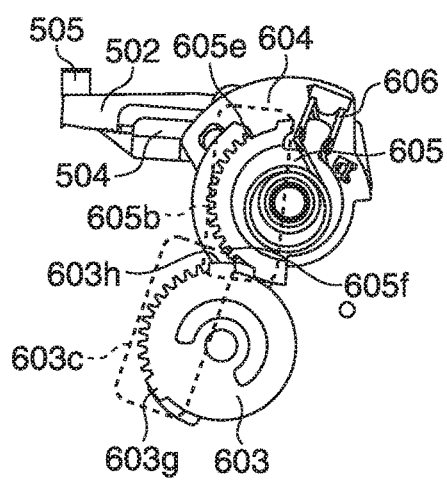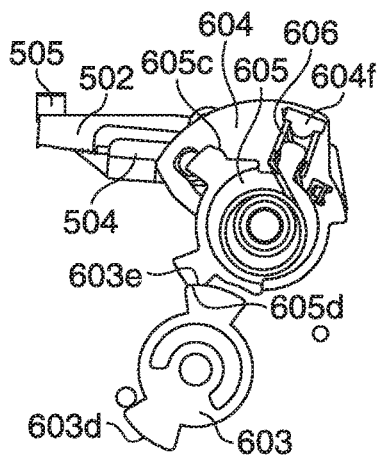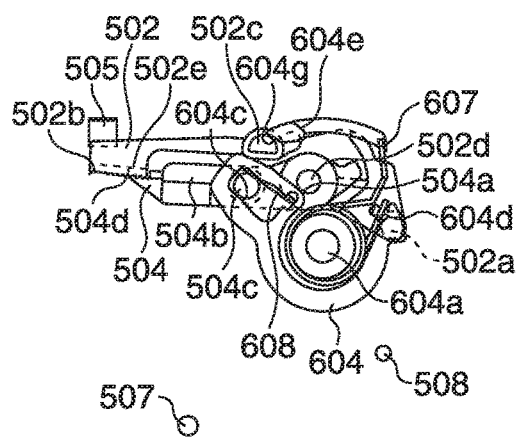
FIG. 15A
FIG. 15B
FIG. 15C
FIG. 15D
FIG. 15E

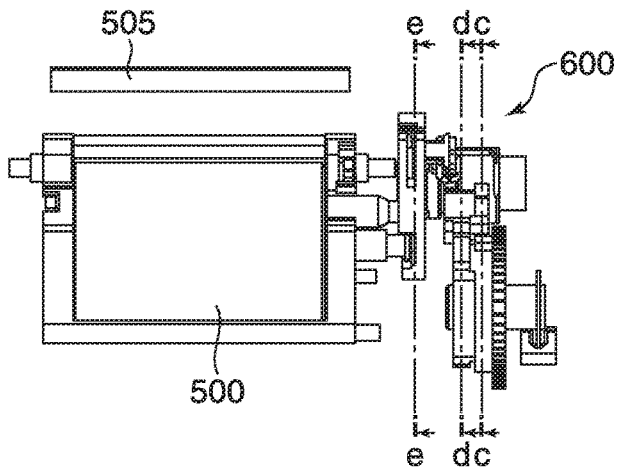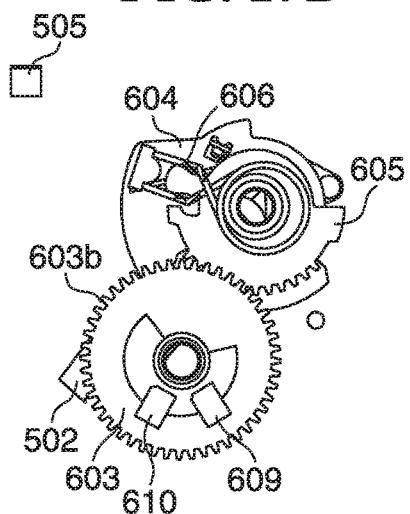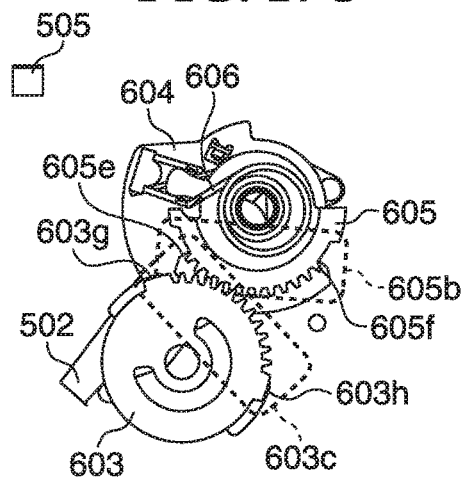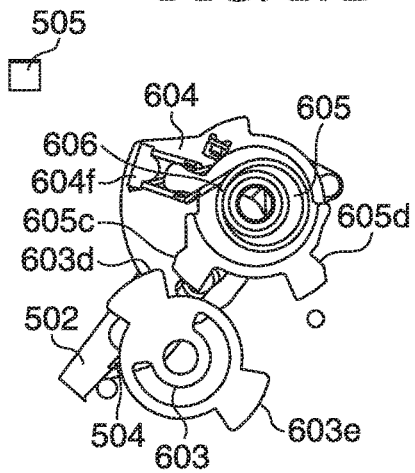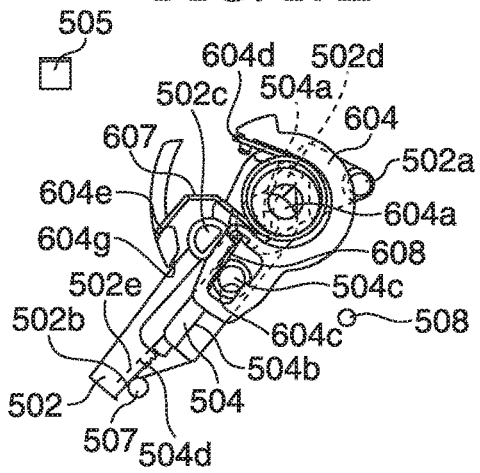

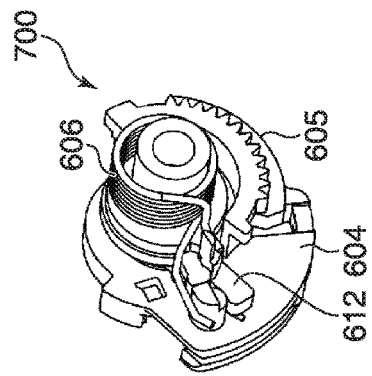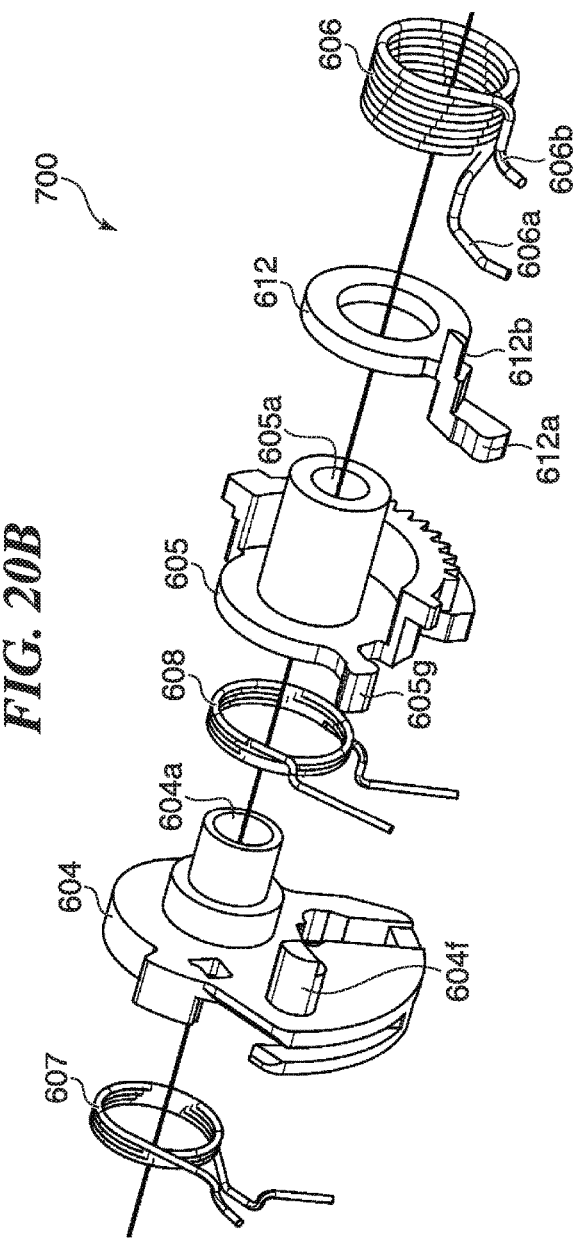
FIG. 20A
FIG. 20B

MIRROR DRIVE DEVICE THAT MOVES MIRROR HOLDERS AND IMAGE PICKUP APPARATUS

BACKGROUND OF THE INVENTION

Field of the Invention

The present invention relates to a mirror drive device equipped with a mechanism for high-speed driving of a mirror unit provided in an image pickup apparatus, such as a single-lens reflex camera, and an image pickup apparatus equipped with the mirror drive device.

Description of the Related Art

In a mirror drive device mounted on an image pickup apparatus, such as a single-lens reflex camera, an operation for retracting a mirror unit formed by a main mirror and a sub mirror from a photographing optical path during photographing and an operation for moving the mirror unit into the photographing optical path during finder observation are performed at high speed. Each mirror of the mirror unit having entered the photographing optical path is brought into contact with an associated stopper formed on the mirror drive device, thereby being positioned in a predetermined stop position to guide an object light flux having passed through a photographic optical system to a viewfinder optical system and a focus detection unit.

As such a mirror drive device as described above, there has been proposed one equipped with a direct drive mechanism for directly driving the main mirror. In this proposed mirror drive device, a voice coil motor causes the main mirror to move from a mirror-down position where the main mirror is in the photographing optical path to a mirror-up position where the main mirror is retracted from the photographing optical path. Further, the main mirror is engaged and locked in the mirror-down position using a locking lug which is slidably moved by a solenoid, and the main mirror is released from the locked state by energizing the solenoid to drive the same slidably moving the locking lug (see Japanese Patent. Laid-Open Publication No. 2010-44271).

In a quick return mechanism. e.g. of a single-lens reflex camera, the mirror unit is rotated between the mirror-down position and the mirror-up position by rotating the main mirror with a spring force, and causing the sub mirror to follow the main mirror using a toggle spring and an inversion cam.

However, in the mechanism that drives the mirror unit using the spring force, to rotate the mirror at high speed, it is necessary to use a spring having a large spring force. For this reason, a large torque is required to charge the spring at high speed during rotation of the mirror, which requires an actuator having a large driving force, or a reduction gear having a large reduction ratio.

To solve this problem, conventionally, there has been proposed a mirror drive device using a spring member which inverts its urging direction during rotation of a mirror (see Japanese Patent Laid-Open Publication No, 2006-30498). In the proposed mirror drive device, the spring member applies the urging force to the mirror in a direction in which the mirror is retracted, when the mirror is in a position for finder observation, and applies the urging force to the mirror in a direction toward the position for finder observation, when the mirror is in the retracted position.

However, in the mirror drive device proposed in Japanese Patent Laid-Open Publication No. 2010-44271, the solenoid which is an additional driving source is required to release the main mirror from the state locked using the locking lug. This increases not only the power consumption, but also manufacturing costs, and further, a space for arranging a slide mechanism for the locking lug and the solenoid is also required, which increases the size of the mirror drive device, leading to an increase in the size of the camera.

Further, in Japanese Patent Laid-Open Publication. No. 2006-30498, after the mirror reaches a position where the urging direction of the spring member for applying the urging force is inverted during rotation of the mirror, it is necessary to always charge the spring member. This increases a load in a charging region of the spring member, which limits achievement of lower torque in rotating the mirror.

SUMMARY OF THE INVENTION

The present invention provides a mirror drive device and an image pickup apparatus that eliminate the need of an additional driving source for releasing a mirror from a locked state, to thereby achieve power saving, lower cost, and size reduction thereof.

Further, the present invention provides a mirror drive device and an image pickup apparatus that achieve lower torque during rotation of the mirror by reducing the amount of charge of an urging member for applying an urging force during rotation of the mirror.

In a first aspect of the invention, there is provided an mirror drive device comprising a first mirror holder that holds a first mirror and is configured to be movable between a first position in a photographing optical path and a second position retracted from the photographing optical path, a second mirror holder that holds a second mirror in a state rotatably attached to the first mirror holder and is configured to be movable between a third position in the photographing optical path and a fourth position retracted from the photographing optical path, a motor, a first driving member configured to be driven by the motor, and a second driving member configured to move the second mirror holder between the third position and the fourth position, wherein when the first mirror holder is in the first position, and the second mirror holder is in the third position, the first driving member and the second driving member are connected by cams provided on the first driving member and the second driving member, respectively, to thereby restrict movement of the second driving member, wherein when the first mirror holder is in a position between the first position and the second position, and when the second mirror holder is in a position between the third position and the fourth position, the first driving member and the second driving member are connected by gears provided on the first driving member and the second driving member, respectively, to thereby enable the second driving member to move the second mirror holder, and wherein when the second mirror holder is moved from the third position to the fourth position, the second mirror holder is brought into contact with the first mirror holder, whereby the first mirror holder is pushed by the second mirror holder, thereby being moved from the first position to the second position.

In a second aspect of the invention, there is provided a mirror drive device comprising a first mirror holder that holds a first mirror and is configured to be movable between a first position in a photographing optical path and a second position retracted from the photographing optical path, a first urging member configured to urge the first mirror holder in a direction toward the first position, a second mirror holder that holds a second mirror in a state rotatably attached to the first mirror holder and is configured to be movable between a third position in the photographing optical path and a fourth position retracted from the photographing optical path, a motor, and a driving member configured to be driven by the motor to move the second mirror holder between the third position and the fourth position, wherein when the first mirror holder is in the first position, and the second mirror holder is in the third position, one end of the first urging member is hooked on a first hook portion formed on the first mirror holder, and another end of the first urging member is hooked on a second hook portion formed on the driving member, and wherein when the first mirror holder is in the first position, and the second mirror holder is moved from the third position toward the fourth position, to enter a state overlaid on the first mirror holder, the one end of the first urging member is hooked on a third hook portion formed on the driving member, and the other end of the first urging member is hooked on the second hook portion.

In a third aspect of the invention, there is provided an image pickup apparatus comprising a first mirror holder that holds a first mirror and is configured to be movable between a first position in a photographing optical path and a second position retracted from the photographing optical path, a second mirror holder that holds a second mirror in a state rotatably attached to the first mirror holder and is configured to be movable between a third position in the photographing optical path and a fourth position retracted from the photographing optical path, a motor, a first driving member configured to be driven by the motor, and a second driving member configured to move the second mirror holder between the third position and the fourth position, wherein when the first mirror holder is in the first position, and the second mirror holder is in the third position, the first driving member and the second driving member are connected by cams provided on the first driving member and the second driving member, respectively, to thereby restrict movement of the second driving member, wherein when the first mirror holder is in a position between the first position and the second position, and when the second mirror holder is in a position between the third position and the fourth position, the first driving member and the second driving member are connected by gears provided on the first driving member and the second driving member, respectively, to thereby enable the second driving member to move the second mirror holder, and wherein when the second mirror holder is moved from the third position to the fourth position, the second mirror holder is brought into contact with the first mirror holder, whereby the first mirror holder is pushed by the second mirror holder, thereby being moved from the first position to the second position.

In a fourth aspect of the invention, there is provided an image pickup apparatus comprising a first mirror holder that holds a first mirror and is configured to be movable between a first position in a photographing optical path and a second position retracted from the photographing optical path, a first urging member configured to urge the first mirror holder in a direction toward the first position, a second mirror holder that holds a second mirror in a state rotatably attached to the first mirror holder and is configured to be movable between a third position in the photographing optical path and a fourth position retracted from the photographing optical path, a motor, and a driving member configured to be driven by the motor to move the second mirror holder between the third position and the fourth position, wherein when the first mirror holder is in the first position, and the second mirror holder is in the third position, one end of the first urging member is hooked on a first hook portion formed on the first mirror holder, and another end of the first urging member is hooked on a second hook portion formed on the driving member, and wherein when the first mirror holder is in the first position, and the second mirror holder is moved from the third position toward the fourth position, to enter a state overlaid on the first mirror holder, the one end of the first urging member is hooked on a third hook portion formed on the driving member, and the other end of the first urging member is hooked on the second hook portion.

According to the first and third aspects of the invention, it is possible to provide a mirror drive device and an image pickup apparatus which eliminate the need of an additional driving source for releasing a mirror from a locked state, and achieves power saving, lower cost, and size reduction thereof.

According to the second and fourth aspects of the invention, it is possible to reduce the amount of charge of an urging member for applying an urging force during rotation of the mirror, and hence it is possible to provide a mirror drive device and an image pickup apparatus that achieve lower torque during rotation of the mirror.

Further features of the present invention will become apparent from the following description of exemplary embodiments (with reference to the attached drawings).

BRIEF DESCRIPTION OF THE DRAWINGS

FIGS. 15A to 15E are views useful in explaining states of the components of the mirror drive unit immediately after the mirror drive unit starts mirror-down driving.

FIGS. 17A to 17E are views useful in explaining states of the components of the mirror drive unit when the main mirror holder reaches its mirror-down position.

FIG. 20A is a perspective view of a mirror drive lever unit of a digital single-lens reflex camera which is an image pickup apparatus equipped with a mirror drive device according to a second embodiment of the present invention.

FIG. 20B is an exploded perspective view of the mirror drive lever unit shown in FIG. 20A.

DESCRIPTION OF THE EMBODIMENTS

The present invention will now be described in detail below with reference to the accompanying drawings showing embodiments thereof.

Figure 1:
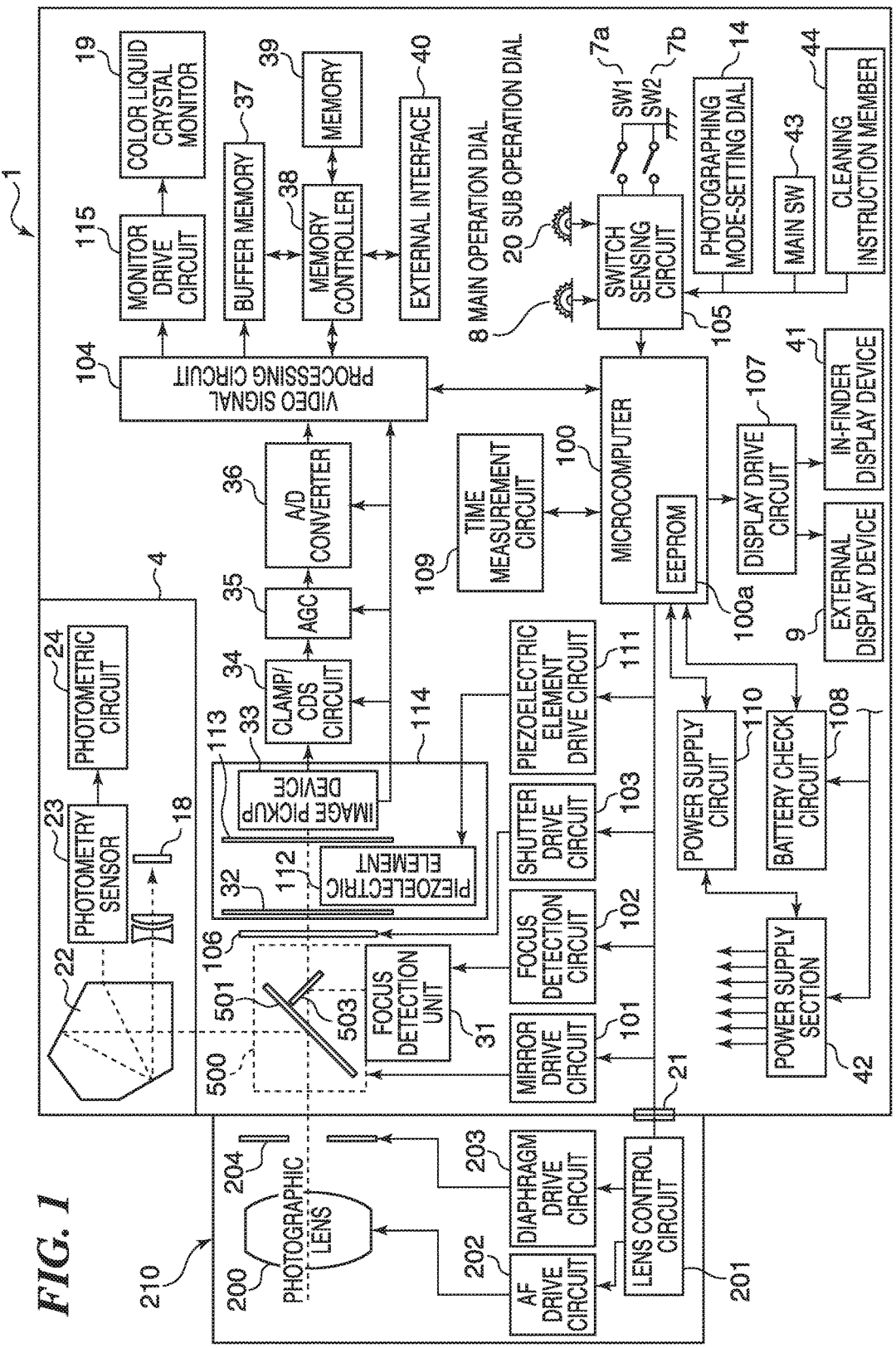
FIG. 1 is a block diagram of the system configuration of a digital single-lens reflex camera which is an image pickup apparatus equipped with a mirror drive device according to a first embodiment of the present invention.

FIG. 1 is a block diagram of the system configuration of a digital single-lens reflex camera which is an image pickup apparatus equipped with a mirror drive device according to a first embodiment of the present invention.

Referring to FIG. 1, in the digital single-lens reflex camera (hereinafter referred to as the camera) according to the present embodiment, an interchangeable lens unit 210 is mounted on a camera body 1 via a mount contact portion 21 in a removable manner.

First, a description will be given of the camera body 1. In FIG. 1, a microcomputer 100 (hereinafter referred to as the MPU 100) controls the overall operation of the camera. An EEPROM 100a incorporated in the MPU 100 stores time information of a time measurement circuit 109, control programs, and other information items. To the MPU 100, there are connected a mirror drive circuit 101, a focus detection circuit 102, a shutter drive circuit 103, a video signal processing circuit 104, a switch sensing circuit 105, and a photometry circuit 24 of a viewfinder optical system 4. Further, to the MPU 100, there are connected a display drive circuit 107, a battery check circuit 108, the time measurement circuit 109, a power supply circuit 110, and a piezoelectric element drive circuit 111, and these circuits are driven by the control of the MPU 100.

A mirror unit 500 includes a main mirror 501 formed by a half mirror, and a sub mirror 503, which are moved to a position where they retract from a photographing optical path (mirror-up position) during photographing, and are moved to a position where they enter the photographing optical path (mirror-down position) during finder observation.

When the mirror unit 500 is in the mirror-down position, the main mirror 501 reflects an object light flux having passed through a photographic lens 200 as a component of a photographic optical system of the lens unit 210, thereby guiding the same to the viewfinder optical system 4, and also causes part of the object light flux to transmit therethrough, thereby guiding the same to the sub mirror 503. The sub mirror 503 reflects the object light flux transmitted through the main mirror 501, thereby guiding the same to a focus detection unit 31. Further, when the mirror unit 500 is in the mirror-up position, the object light flux having passed through the photographic lens 200 is guided to an image pickup device 33.

The mirror drive circuit 101 controls driving of a motor 601 (see FIG. 3) for rotating the mirror unit 500 between the mirror-up position (see FIG. 2C) and the mirror-down position (see FIG. 2A), and detects a position of the mirror unit 500.

The focus detection unit 31 is formed by a field lens disposed in the vicinity of an imaging surface, not shown, a reflection mirror, a secondary imaging lens, a diaphragm, a line sensor formed by a plurality of CCD sensors, and so forth. A signal output from the focus detection unit 31 is supplied to the focus detection circuit 102, and is sent to the MPU 100 after being converted to an object image signal. The MPU 100 performs focus detection calculation by a phase difference detection method based on the supplied object image signal. Then, the MPU 100 calculates a defocus amount and a defocus direction, and controls a lens control circuit 201 and an AF drive circuit 202 of the lens unit 210 to drive a focus lens of the photographic lens 200 to an in-focus position based on a result of the calculation.

A pentaprism 22 converts the object light flux reflected by the main mirror 501 in the mirror-down position to an erect normal image, to reflect the converted image, whereby a user can view the converted erect normal image, as an object image, from a finder eyepiece window 18 via the viewfinder optical system 4. Further, the pentaprism 22 also guides part of the object light flux to a photometry sensor 23, and the photometry circuit 24 converts photometric results output from the photometry sensor 23 to luminance signals of respective areas on an observation surface, and outputs the luminance signals to the MPU 100. The MPU 100 calculates an exposure value based on the luminance signals output from the photometry circuit 24.

A focal plane shutter 106 blocks an object light flux guided to the image pickup device 33 during finder observation, and during photographing, operates to obtain a desired exposure time based on a time difference between traveling of a front curtain, not shown, and traveling of a rear curtain, not shown, in response to a release signal input by the user. The focal plane shutter 106 is controlled by the shutter drive circuit 103 in response to a command from the MPU 100.

An image pickup device unit 114 is comprised of the image pickup device 33, a laminate-type piezoelectric element 112, and an optical low-pass filter 113. The image pickup device 33 is implemented e.g. by a CCD sensor, a CMOS sensor, or a CID sensor. A clamp/CDS (correlated double sampling) circuit 34 performs basic analog processing before A/D conversion, and is also capable of changing a clamp level. An AGC (automatic gain controller) 35 performs basic analog processing before A/D conversion, and is also capable of changing an AGC basic level. An analog-to-digital converter 36 converts an analog signal output from the image pickup device 33 to a digital signal.

An infrared ray cut filter 32 is formed into a substantially rectangular shape, and cuts unnecessary infrared light of an object light flux to be guided to the image pickup device 33. The infrared ray cut filter 32 has a surface covered by a conductive material in order to prevent foreign matter from sticking thereto. The optical low-pass filter 113 is formed by laminating and affixing a plurality of birefringent plates and phase plates, which are made of quartz, to each other, and further affixing an infrared ray cut filter to the resulting laminate. The laminate-type piezoelectric element 112 is excited by the piezoelectric element drive circuit 111 having received a command from the MPU 100, and vibration thereof is transmitted to the optical low-pass filter 113.

The video signal processing circuit 104 performs general image processing by hardware, such as gamma/knee processing, filtering processing, and information synthesis processing for monitor display, on digital image data. Color image data for monitor display, output from the video signal processing circuit 104, is displayed on a color liquid crystal monitor 19 via a monitor drive circuit 115.

Further, the video signal processing circuit 104 is also capable of storing image data in a buffer memory 37 via a memory controller 38 according to an instruction from the MPU 100. Further, the video signal processing circuit 104 has a function of performing image data compression processing, such as JPEG compression. Further, in a case where images are continuously photographed e.g. by continuous photographing, the video signal processing circuit 104 is also capable of temporarily storing image data in the buffer memory 37, and sequentially reading out unprocessed image data via the memory controller 38. This enables the video signal processing circuit 104 to sequentially perform image processing and compression processing on the unprocessed image data regardless of a rate at which image data is output from the A/D converter 36.

The memory controller 38 has a function of storing image data output from an external interface 40, such as a USB output connector, in a memory 39, and a function of outputting image data stored in the memory 39 to the external interface 40. Note that as the memory 39, for example, a flash memory is used which can be mounted and removed to and from the camera body 1.

A release switch (SW1) 7a is turned on e.g. by an operation of half-pressing a release button, not shown, and sends an operation signal for starting photographing preparation to the MPU 100 via the switch sensing circuit 105. A release switch (SW2) 7b is turned on e.g. by an operation of fully pressing the release button, and sends an operation signal for starting photographing to the MPU 100 via the switch sensing circuit 105. Further, the switch sensing circuit 105 sends operation signals to the MPU 100 according to the respective operating states of a main operation dial 8, a sub operation dial 20, a photographing mode-setting dial 14, a main switch 43, and a cleaning instruction member 44.

The display drive circuit 107 drives an external display device 9 and an in-finder display device 41 according to instructions from the MPU 100. The battery check circuit 108 performs battery check for a predetermined time period according to an instruction from the MPU 100, and sends a result of the check to the MPU 100. A power supply section 42 supplies necessary power to the components of the camera according to an instruction provided from the MPU 100 via the power supply circuit 110. The time measurement circuit 109 measures a time period elapsed after the main switch 43 is turned off until the main switch 43 is turned on next, and sends a result of the measurement to the MPU 100 in response to a command from the MPU 100.

Next, a description will be given of the lens unit 210. The lens unit 210 includes the lens control circuit 201, and the lens control circuit 201 performs communication with the MPU 100 of the camera body 1 via the mount contact portion 21. The mount contact portion 21 also has a function of sending a signal to the MPU 100 when the lens unit 210 is connected to the camera body 1.

The lens control circuit 201 performs communication with the MPU 100 by using this function, and drives the photographic lens 200 and the diaphragm, denoted by reference numeral 204, via the AF drive circuit 202 and a diaphragm drive circuit 203. Although FIG. 1 shows one photographic lens 200 for convenience of explanation, the photographic lens 200 is actually formed by a lens group including a plurality of lenses.

The AF drive circuit 202 is comprised of e.g. a stepping motor, and changes the position of the focus lens of the photographic lens 200 in a direction of an optical axis under the control of the lens control circuit 201 to thereby perform the focusing operation. The diaphragm drive circuit 203 is comprised of e.g. an automatic iris, and changes the opening diameter of the diaphragm 204 under the control of the lens control circuit 201 to thereby obtain an optical aperture value.

Figure 2A:
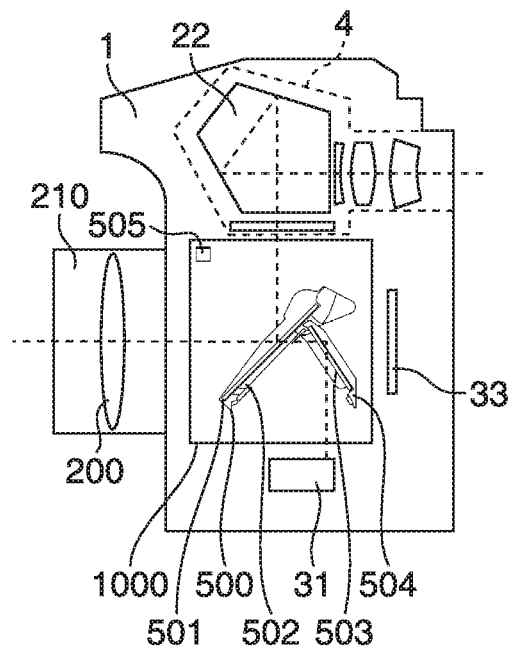
FIG. 2A is a schematic side cross-sectional view of the digital single-lens reflex camera in a mirror-down position.
Figure 2B:
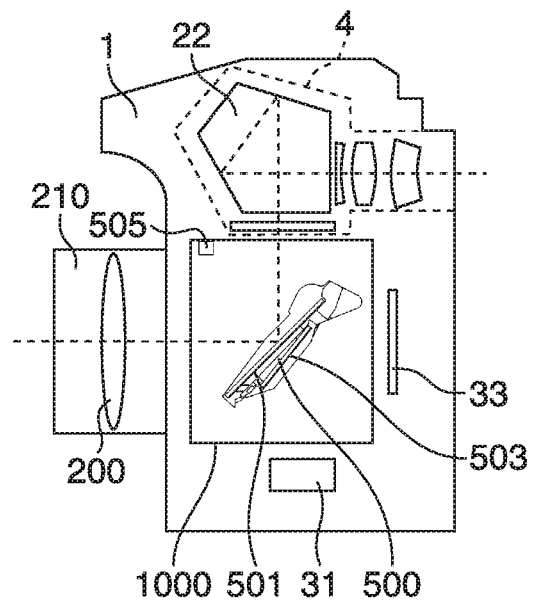
FIG. 2B is a schematic side cross-sectional view of the digital single-lens reflex camera in the mirror-down position in which a sub mirror is in a state closed to a main mirror.
Figure 2C:
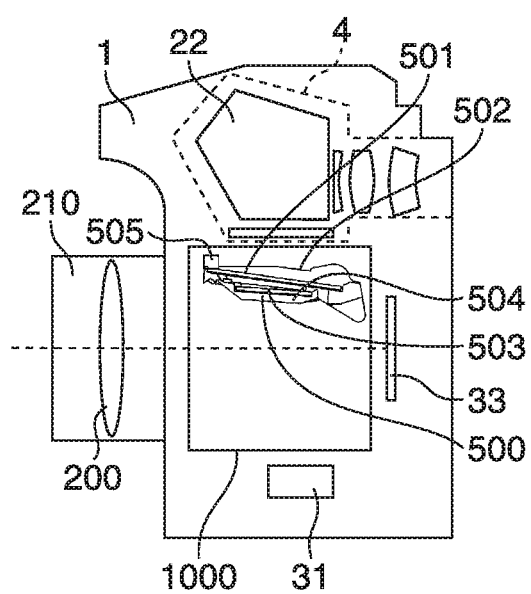
FIG. 2C is a schematic side cross-sectional view of the digital single-lens reflex camera in a mirror-up position.

FIG. 2A is a schematic side cross-sectional view of the camera when the mirror unit 500 is in the mirror-down position, and FIG. 2B is a schematic side cross-sectional view of the camera in a state in which the sub mirror 503 is closed to the main mirror 501 when the mirror unit 500 is in the mirror-down position. FIG. 2C is a schematic side cross-sectional view of the camera when the mirror unit 500 is in the mirror-up position.

As shown in FIGS. 2A to 20, the main mirror 501 of the mirror unit 500 is held by a main mirror holder 502, and the sub mirror 503 is held by a sub mirror holder 504. Further, the main mirror holder 502 is rotatably supported with respect to a mirror box 400 (see FIG. 3), and the sub mirror holder 504 is rotatably supported with respect to the main mirror holder 502. The mirror unit 500 is driven by a mirror drive unit 1000, and is turned between the mirror-down position shown in FIG. 2A and the mirror-up position shown in FIG. 2C.

Here, the main mirror 501, the sub mirror 503, the main mirror holder 502, and the sub mirror holder 504 correspond to respective examples of a first mirror, a second mirror, a first mirror holder, and a second mirror holder. Further, the mirror-down position and the mirror-up position of the main mirror holder 502 correspond to respective examples of a first position and a second position. Further, the mirror-down position and the mirror-up position of the sub mirror holder 504 correspond to respective examples of a third position and a fourth position.

In the mirror-down position shown in FIG. 2A, the mirror unit 500 enters the photographing optical path, an object light flux having passed through the photographic lens 200 is reflected by the main mirror 501, and part of the object light flux is transmitted through the main mirror 501 and is reflected by the sub mirror 503. The object light flux reflected by the main mirror 501 is guided to the pentaprism 22 of the viewfinder optical system 4, and the object light flux reflected by the sub mirror 503 is guided to the focus detection unit 31.

Further, in the mirror-up position shown in FIG. 2C, the mirror unit 500 is retracted from the photographing optical path, and an object light flux having passed through the photographic lens 200 is guided to the image pickup device 33 to form an image, which is photoelectrically converted.

Figure 3:
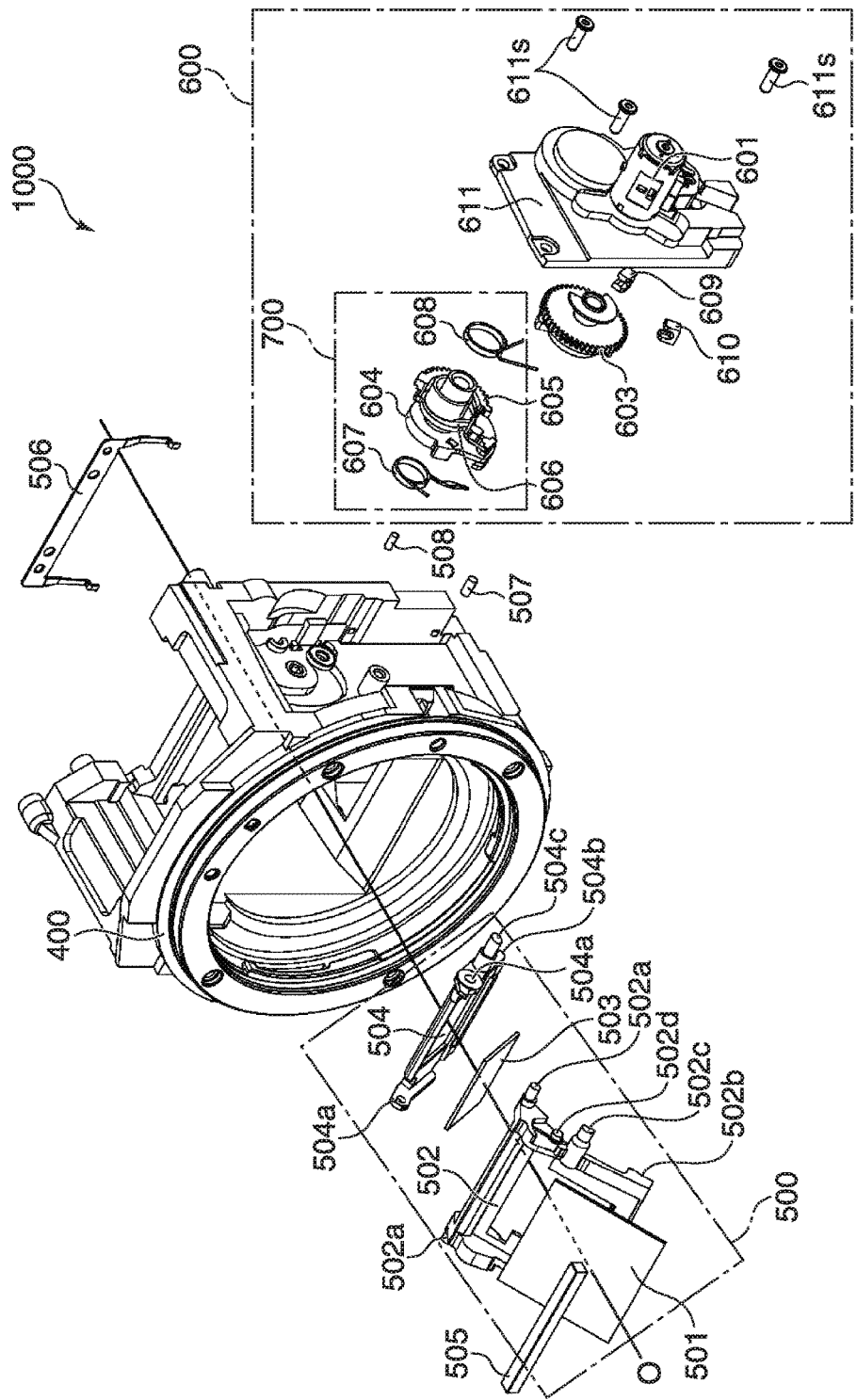
FIG. 3 is an exploded perspective view of a mirror drive unit.

FIG. 3 an exploded perspective view of the mirror drive unit 1000. As shown in FIG. 3, the mirror drive unit 1000 includes the mirror box 400, the mirror unit 500, and a mirror charge unit 600.

The main mirror holder 502 of the mirror unit 500 is formed with rotational shafts 502a, and the rotational shafts 502a are rotatably supported with respect to the mirror box 400. Further, the main mirror holder 502 is formed with a shaft portion 502c having a semicircular cross section, and a first contact portion 502b. When the mirror unit 500 is in the mirror-down position, the shaft portion 502c of the main mirror holder 502 is urged in a mirror-down direction by the other end of a spring 607 having one end hooked on a spring urging portion 604d, and the first contact portion 502b is brought into contact with a positioning shaft 507. The positioning shaft 507 is formed e.g. by an eccentric pin, and by rotating the positioning shaft 507, it is possible to adjust the mirror-down position of the main mirror holder 502. The spring 607 corresponds to an example of an urging member.

Here, the spring 607, the shaft portion 502c, and the spring urging portion 604d correspond to respective examples of a first urging member, a first hook portion, and a second hook portion.

The sub mirror holder 504 is formed with support holes 504a, and is rotatably supported on rotational shaft portions 502d of the main mirror holder 502 by having the support holes 504a fitted thereon. This make the sub mirror holder 504 rotatable with respect to the main mirror holder 502 about the rotational shaft portions 502d.

Further, the sub mirror holder 504 is formed with a drive shaft portion 504c and a first contact portion 504b. When the mirror unit 500 is in the mirror-down position, the drive shaft portion 504c of the sub mirror holder 504 is urged by a spring 608 in the mirror-down direction, and the first contact portion 504b is brought into contact with a positioning shaft 508. The positioning shaft 508 is formed e.g. by an eccentric pin, and by rotating the positioning shaft 508, it is possible to adjust the mirror-down position of the sub mirror holder 504. The positioning shaft 508 corresponds to an example of a position adjustment member, and the spring 608 corresponds to an example of a second urging member.

The mirror box 400 is provided with a stopper 505 with which a front end of the main mirror holder 502 rotated to the mirror-up position is brought into contact. The stopper 505 is formed of an elastic member which can absorb impact applied when the main mirror holder 502 is brought into contact with the stopper 505. Further, on a rear side of the mirror box 400, there is disposed a shaft retaining plate 506 for retaining the rotational shafts 502a of the main mirror holder 502. By attaching the shaft retaining plate 506 to the mirror box 400, the main mirror holder 502 is mounted on the mirror box 400 in a manner rotatable with respect thereto without coming off.

The mirror charge unit 600 is mounted on a right side of the mirror box 400, as viewed from the direction of the optical axis O. The mirror charge unit 600 includes the motor 601, a cam gear 603, a mirror drive lever unit 700, photo-interrupters 609 and 610, and a gear base 611. The motor 601 is supported on the gear base 611, and the gear base 611 is mounted on the right side of the mirror box 400, as viewed from the direction of the optical axis O, with screws 611s. Here, the cam gear 603 corresponds to an example of a first driving member.

Figure 4:
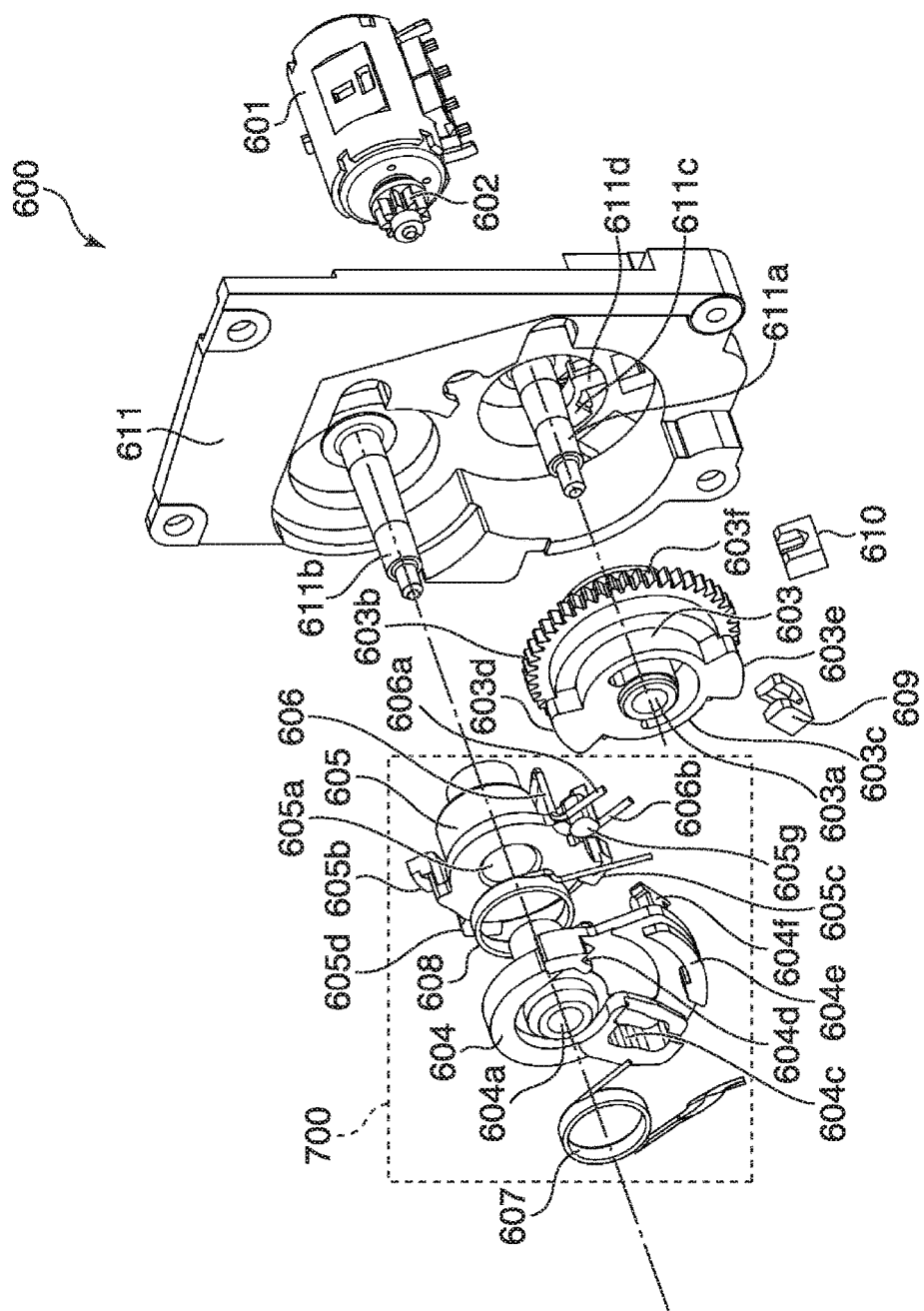
FIG. 4 is an exploded perspective view of a mirror charge unit.

FIG. 4 is an exploded perspective view of the mirror charge unit 600. As shown in FIG. 4, the cam gear 603 is rotatably supported on a first shaft portion 611a of the gear base 611 by having the first shaft portion 611a fitted in a support hole 603a thereof, which is the center of rotation. The mirror drive lever unit 700 includes a mirror drive lever 604, a mirror drive gear 605, a spring 606, and the springs 607 and 608.

The mirror drive lever 604 has a support hole 604a, which is the center of rotation, and is rotatably supported on a second shaft portion 611b formed on the gear base 611 by having the second shaft portion 611b fitted in the support hole 604a. The mirror drive gear 605 also has a support hole 605a, which is the center of rotation, and is rotatably supported on the second shaft portion 611b formed on the gear base 611 by having the second shaft portion 611b fitted in the support hole 605a. That is, the mirror drive lever 601 and the mirror drive gear 605 are rotatably mounted with respect to the gear base 611 coaxially with each other.

The mirror drive lever 604 is attached to the mirror drive gear 605 via the spring 606. More specifically, one end 606a of the spring 606 is hooked on a spring urging portion 604f which is part of the mirror drive lever 604, and the other end 606b of the spring 606 is hooked on a spring urging portion 605g which is part of the mirror drive gear 605.

In this state, the spring 606 is urged in a direction in which the one end 606a and the other end 606b thereof sandwich the spring urging portion 604f and the spring urging portion 605g. This enables the mirror drive lever 604 to rotate substantially in unison with the mirror drive gear 605. Further, the spring 607 for urging the main mirror holder 502 in the mirror-down direction, and the spring 608 for urging the sub mirror holder 504 in the mirror-down direction are held on the mirror drive lever 604.

Here, the mirror drive lever 604, the mirror drive gear 605, and the spring 606 correspond to an example of a second driving member. Further, the mirror drive lever 604, the mirror drive gear 605, and the spring 606 correspond to respective examples of an engagement member, a connection member and a first urging member. Further, the springs 607 and 608 correspond to respective examples of the second urging member and a third urging member.

The motor 601 formed e.g. by a stepping motor is fixed to the gear base 611, and has a pinion 602 fitted on an output shaft thereof. The mirror drive circuit 101 counts the number of pulses supplied to the motor 601 from the start of driving of the mirror unit 500, and this enables the MPU 100 to recognize the phase of the mirror unit 500 via the mirror drive circuit 101.

When the cam gear 603 and the motor 601 are mounted on the gear base 611, a first gear portion 603b formed on the cam gear 603 and the pinion 602 of the motor 601 are meshed with each other. Further, when the mirror drive lever unit 700 is mounted on the gear base 611, a second gear portion 603c formed on the cam gear 603 and a gear portion 605b of the mirror drive gear 605 are meshed with each other. Therefore, a driving force of the motor 601 is transmitted to the mirror drive lever unit 700 via the cam gear 603. Here, the cam gear 603, the mirror drive lever 604, and the mirror drive gear 605 correspond to an example of a driving member.

The photo-interrupters 609 and 610 are fixedly engaged with a first locking portion 611c and a second locking portion 611d, formed on the gear base 611, respectively. As the cam gear 603 is rotated, the states of the photo-interrupters 609 and 610 are each changed by a light shielding plate 603f formed on the cam gear 603 between a light-receiving state and a non-light-receiving state. The MPU 100 determines the phase of the mirror unit 500 via the mirror drive circuit 101 based on the output signals from the photo-interrupters 609 and 610.

Figure 5A:
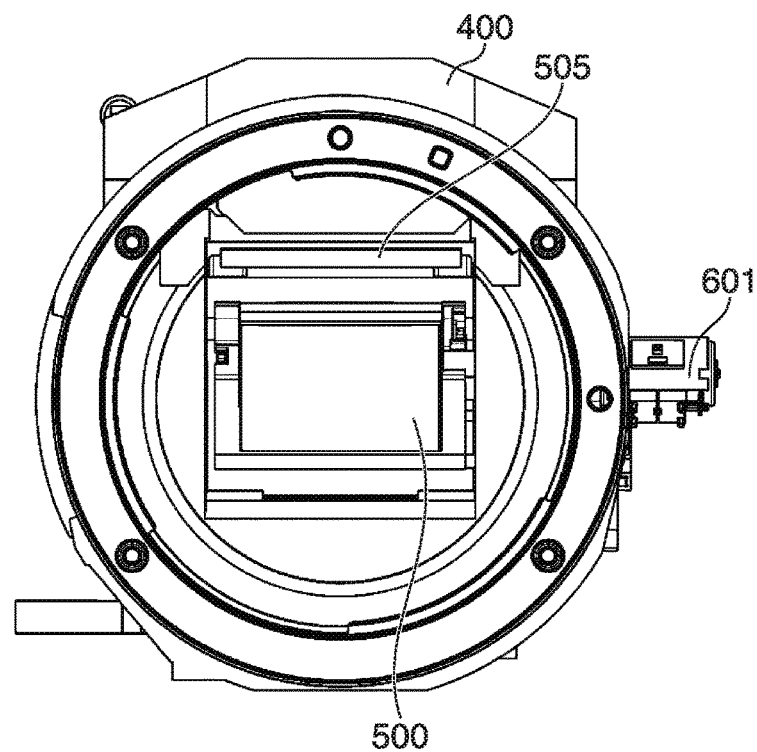
FIG. 5A is a front view of the mirror drive unit as viewed from an optical axis direction.
Figure 5B:
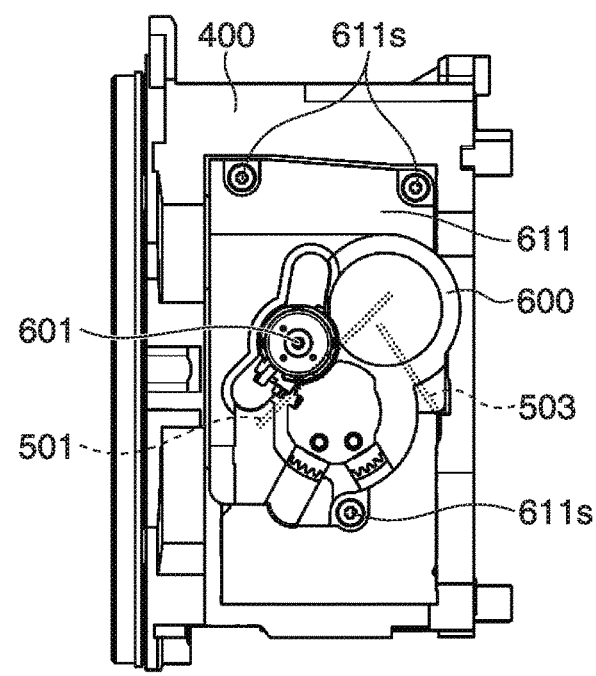
FIG. 5B is a right side view of the mirror drive unit shown in FIG. 5A.

FIG. 5A is a front view of the mirror drive unit 1000 as viewed from the optical axis direction, and FIG. 5B is a right side view of the mirror drive unit 1000. As shown in FIG. 5B, the mirror charge unit 600 is mounted on one of the sides of the mirror box 400.

Figure 6:
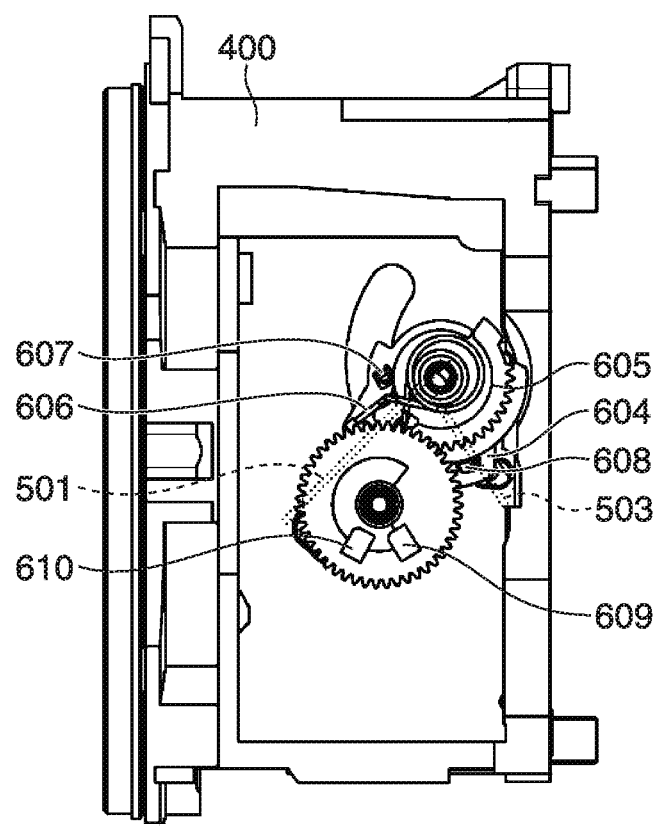
FIG. 6 is a view of the mirror drive unit shown in FIG. 5B, with its motor and gear base removed therefrom.

FIG. 6 is a view of the mirror drive unit 1000 shown in FIG. 5B, with the motor 601 and the gear base 611 removed therefrom. In the state shown in FIG. 6, the mirror unit 500 is in the mirror-down position.

Figure 7:
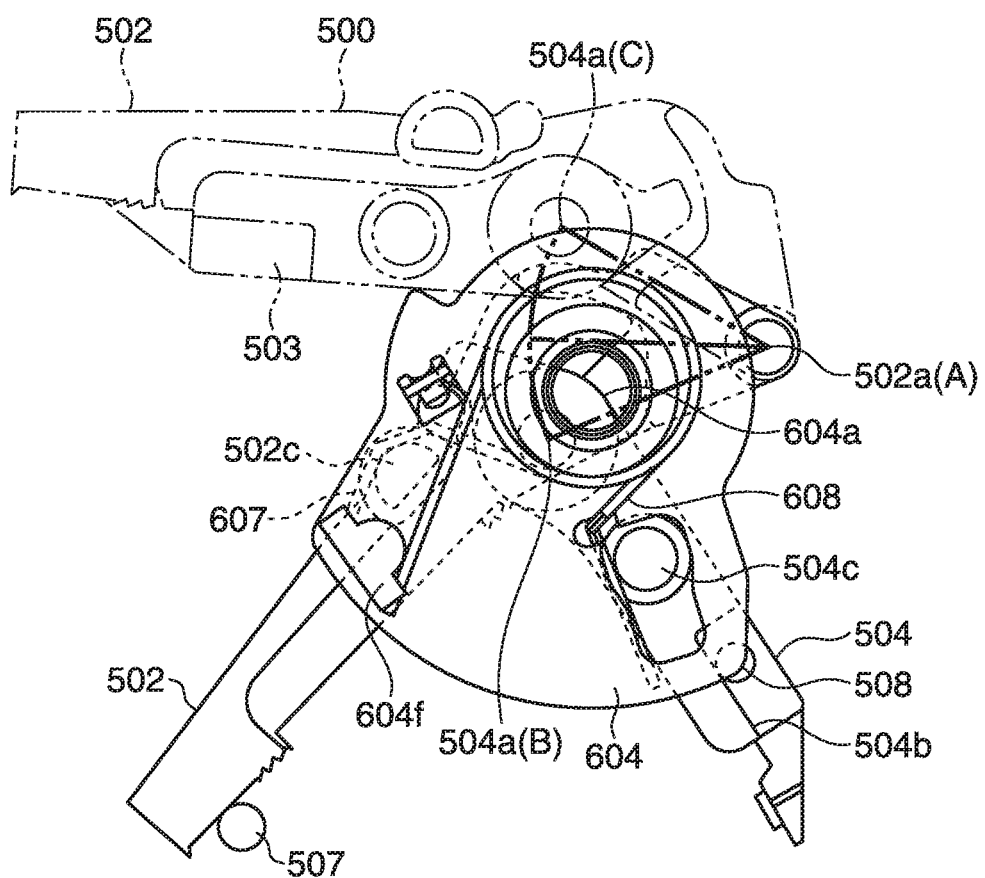
FIG. 7 is a view useful in explaining the relationship between a mirror unit and the mirror charge unit.

FIG. 7 a view useful in explaining the relationship between the mirror unit 500 and the mirror charge unit 600. Note that FIG. 7 shows only the mirror unit 500, the mirror drive lever 604, and the springs 607 and 608, appearing in FIG. 6.

Referring to FIG. 7, the center of the rotational shaft 502a of the main mirror holder 502 is set as A. Further, the center of the support hole 504a which is the center of rotation of the sub mirror holder 504 in the mirror-down state is set as B, and the center of the support hole 504a which is the center of rotation of the sub mirror holder 504 in the mirror-up state is set as C.

At this time, as shown in FIG. 7, the center of the support hole 604a which is the center of rotation of the mirror drive lever 604 is positioned radially inside a segment of a sector formed by connecting B and C with A in the center. This makes it possible to reduce changes in distance from the center of the support hole 604a which is the center of rotation of the mirror drive lever 604 to the drive shaft portion 504c of the sub mirror holder 504 during driving of the mirror unit 500. Therefore, it is possible to reduce load variation occurring during driving of the mirror unit 500.

Further, in the present embodiment, the center of the support hole 604a which is the center of rotation of the mirror drive lever 604 is positioned radially inside the segment of the sector formed about A by connecting B and C, and also in an area closer to B than to C. With this, although detailed description will be given hereinafter, a down lever portion 604g (see FIG. 8E) of the mirror drive lever 604 passes a route different from a rotation locus of the shaft portion 502c of the main mirror holder 502 during the mirror-up operation of the mirror unit 500.

Further, when the mirror-down operation of the mirror unit 500 is started, the down lever portion 604g of the mirror drive lever 604 is brought into contact with the shaft portion 502c of the main mirror holder 502, and is enabled to assist the mirror-down operation. Note that even when the center of the support hole 604a which is the center of rotation of the mirror drive lever 604 is positioned radially outside the above-mentioned segment of the sector, the mirror-up/mirror-down operation can be performed.

Next, a description will be given of mirror-up driving and mirror-down driving of the mirror unit 500, performed by the mirror drive unit 1000, with reference to FIGS. 8A to 18E. FIGS. 8A to 8E are views useful in explaining states of components of the mirror drive unit 1000 when the mirror unit 500 is in the mirror-down position.

Figure 8A:
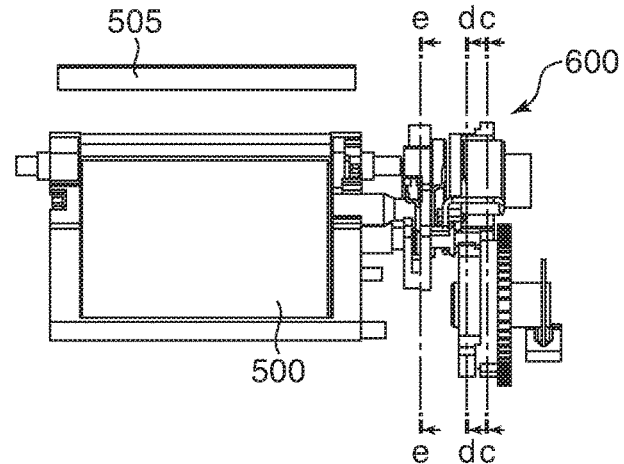
FIGS. 8A to 8E are views useful in explaining states of components of the mirror drive unit when the mirror unit is in the mirror-down position.
Figure 8B:
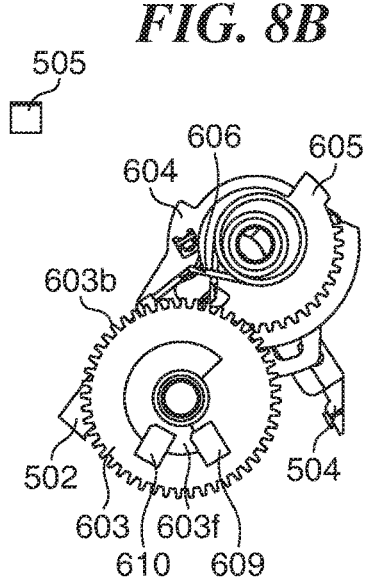

FIG. 8A is a front view useful in explaining the states of the components of the mirror drive unit 1000 when the mirror unit 500 is in the mirror-down position. Note that in FIG. 8A, the mirror box 400, the motor 601, and the gear base 611 are omitted. FIG. 8B is a right side view of FIG. 8A. FIG. 8B shows the relationship between the light shielding plate 603f of the cam gear 603 and the photo-interrupters 609 and 610, when the mirror unit 500 is in the mirror-down position.

In the state shown in FIG. 8B, the photo-interrupter 609 is in the light-receiving state, and the photo-interrupter 610 is in the non-light-receiving state due to being shielded from light by the light shielding plate 603f of the cam gear 603. At this time, the MPU 100 determines via the mirror drive circuit 101 that the mirror unit 500 is in the mirror-down state.

Figure 8C:
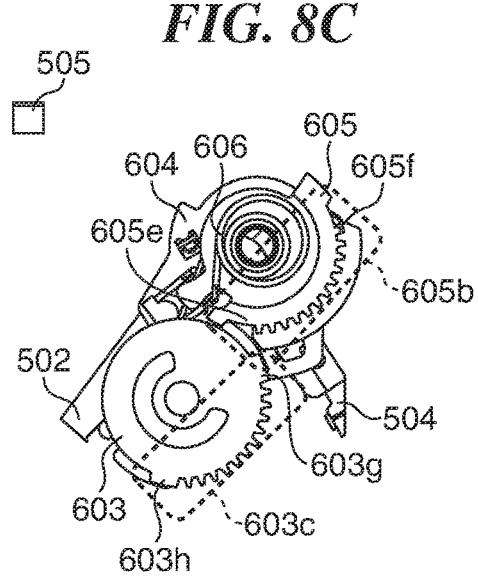

FIG. 8C is a cross-sectional view taken along c-c in FIG. 8A. FIG. 8C shows the relationship between the second gear portion 603c (in FIG. 8C, the reference numeral 603c denotes an area surrounding the corresponding gear portion as a rectangle indicated by broken lines) of the cam gear 603 and the gear portion 605b (in FIG. 8C, the reference numeral 605b denotes an area surrounding the corresponding gear portion as a rectangle indicated by broken lines; the same applies hereafter) of the mirror drive gear 605, when the mirror unit 500 is in the mirror-down position. In the state shown in FIG. 8C, the second gear portion 603c of the cam gear 603 and the gear portion 605b of the mirror drive gear 605 are not in mesh with each other.

Figure 8D:
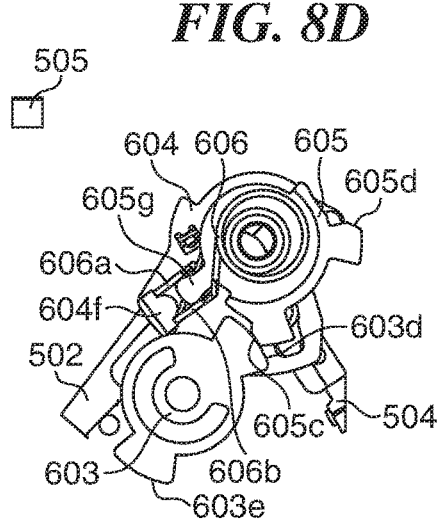

FIG. 8D is a cross-sectional view taken along d-d in FIG. 8A. FIG. 8D shows the relationship between a first cam portion 603d and a second cam portion 603e of the cam gear 603, and a first follower portion 605c and a second follower portion 605d of the mirror drive gear 605, when the mirror unit 500 is in the mirror-down position.

In the state shown in FIG. 8D, the first cam portion 603d of the cam gear 603 is in contact with the first follower portion 605c of the mirror drive gear 605. The first cam portion 603d of the cam gear 603 has a circular arc cam shape concentric with part of the cam gear 603 without a cam lift. Therefore, even when the cam gear 603 is rotated to some degree in a cam area of the first cam portion 603d in this state, rotation is not transmitted to the mirror drive gear 605, so that the mirror drive gear 605 is not rotated.

Further, in this state, when the mirror drive gear 605 is brought into contact with the cam gear 603, in a state urged in the mirror-up direction (clockwise direction as viewed in FIG. 8D), the mirror drive gear 605 is brought into contact with the cam gear 603 such that the urging force acts in a direction substantially toward the center of rotation of the cam gear 603. Therefore, in the state shown in FIG. 8D, unless the cam gear 603 is rotated, the mirror drive gear 605 is restricted from rotating in the mirror-up direction.

Figure 8E:
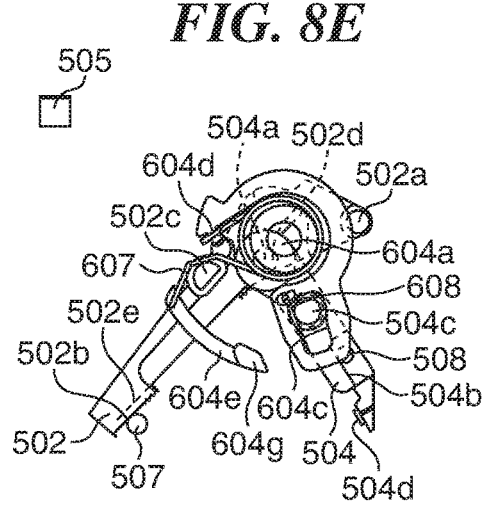

FIG. 8E is a cross-sectional view taken along e-e in FIG. 8A. FIG. 8E shows the relationship between the main mirror holder 502 and the sub mirror holder 504, and the mirror drive lever unit 700 (the mirror drive lever 604, the mirror drive gear 605, and the springs 607 and 608), when the mirror unit 500 is in the mirror-down position.

In the state shown in FIG. 8E, the spring 607 urges the shaft portion 502c of the main mirror holder 502 in the mirror-down direction, whereby the first contact portion 502b of the main mirror holder 502 is brought into contact with the positioning shaft 507. Further, the spring 608 urges the drive shaft portion 504c of the sub mirror holder 504 in the mirror-down direction, whereby the first contact portion 504b of the sub mirror holder 504 is brought into contact with the positioning shaft 508.

In this state, an inner peripheral surface of a rectangular hole 604c of the mirror drive lever 604 is not in contact with the drive shaft portion 504c of the sub mirror holder 504. With this, only the urging force of the spring 608 acts on the sub mirror holder 504, and hence the mirror unit 500 is stably positioned in the mirror-down position.

The mirror drive lever unit 700 is urged in the mirror-up direction by the reaction forces of the springs 607 and 608. As a result, the first follower portion 605c of the mirror drive gear 605 is brought into contact with the first cam portion 603d of the cam gear 603. Then, when the motor 601 is rotated in the mirror-up direction (counterclockwise direction as viewed from the pinion 602) in the state shown in FIGS. 8A to 8E, mirror-up driving of the mirror drive unit 1000 is started, and the state shown in FIGS. 8A to 8E shifts to a state shown in FIGS. 9A to 9E.

FIGS. 9A to 9E are views useful in explaining states of the components of the mirror drive unit 100 immediately before the cam gear 603 and the mirror drive gear 605 are brought into mesh with each other immediately after the mirror drive unit 1000 starts mirror-up driving.

Figure 9A:
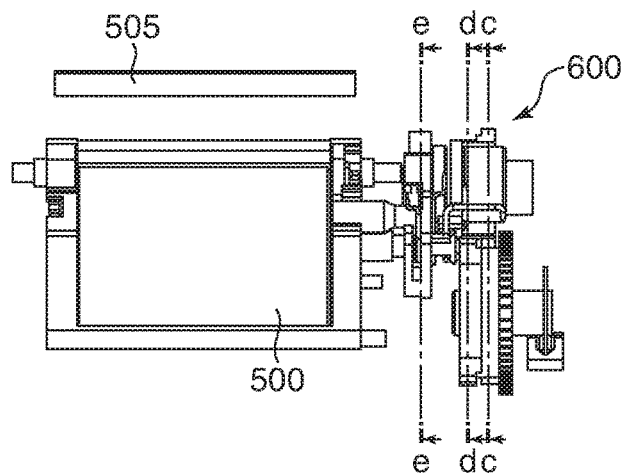
FIGS. 9A to 9E are views useful in explaining states of the components of the mirror drive unit immediately before a cam gear and a mirror drive gear are brought into mesh with each other immediately after the mirror drive unit starts mirror-up driving.
Figure 9B:
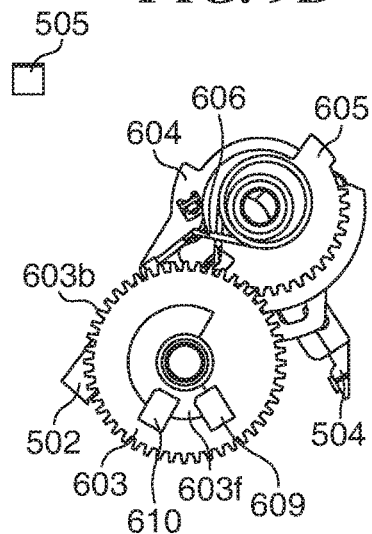

FIG. 9A is a front view showing a state immediately before the mirror unit 500 starts the mirror-up operation, which corresponds to FIG. 8A. FIG. 9B is a right side view of FIG. 9A. FIG. 9B shows the relationship between the light shielding plate 603f of the cam gear 603 and the photo-interrupters 609 and 610 immediately after the mirror drive unit 1000 has started mirror-up driving.

As shown in FIG. 9B, the cam gear 603 is rotated in a counterclockwise direction as viewed in FIG. 9B from the state shown in FIGS. 8A to 8E. In this state, the state of the photo-interrupter 609 is changed from the light-receiving state, shown in FIGS. 8A to 8E, to the non-light-receiving state, by the light shielding plate 603f of the cam gear 603. Further, the photo-interrupter 610 is shielded from light by the light shielding plate 603f of the cam gear 603, thereby continuing to be in the non-light-receiving state. When the state of the photo-interrupter 609 is changed from the light-receiving state to the non-light-receiving state, the MPU 100 determines via the mirror drive circuit 101 that the mirror unit 500 has not completed the mirror-down operation or the mirror-up operation.

Figure 9C:
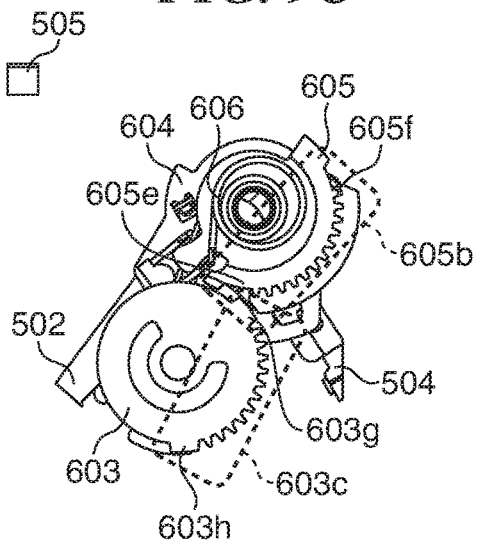

FIG. 9C is a cross-sectional view taken along c-c in FIG. 9A. FIG. 9C shows the relationship between the second gear portion 603c of the cam gear 603 and the gear portion 605b of the mirror drive gear 605 immediately after the mirror drive unit 1000 has started the mirror-up driving.

In the state shown in FIG. 9C, a first gear tooth 603g of the cam gear 603 enters inside the gear outer circle of the gear portion 605b of the mirror drive gear 605. At this time, as described above, the first follower portion 605c is brought into contact with the first cam portion 603d of the cam gear 603, whereby the mirror drive gear 605 is restricted from rotating in the mirror-up direction. Therefore, a first gear tooth 605e of the mirror drive gear 605 is positioned outside the gear outer circle of the second gear portion 603c of the cam gear 603. This enables the second gear portion 603c of the cam gear 603 and the gear portion 605b of the mirror drive gear 605 to stably shift to a meshed state.

Figure 9D:
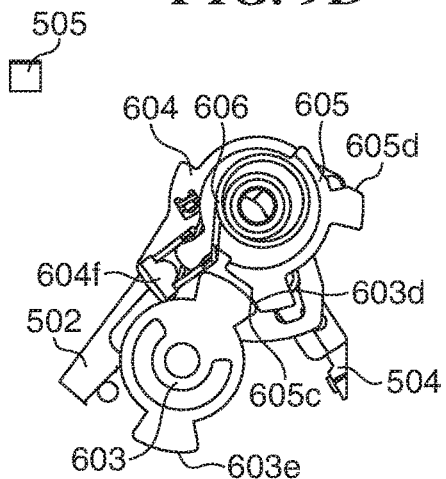

FIG. 9D is a cross-sectional view taken along d-d in FIG. 9A. FIG. 9D shows the relationship between the first cam portion 603d and the second cam portion 603e of the cam gear 603, and the first follower portion 605c and the second follower portion 605d of the mirror drive gear 605, immediately after the mirror drive unit 1000 has started mirror-up driving. In the state shown in FIG. 9D, the first follower portion 605c of the mirror drive gear 605 is in contact with the first cam portion 603d of the cam gear 603. Further, the second cam portion 603e of the cam gear 603 and the second follower portion 605d of the mirror drive gear 605 are not in contact with each other.

Figure 9E:
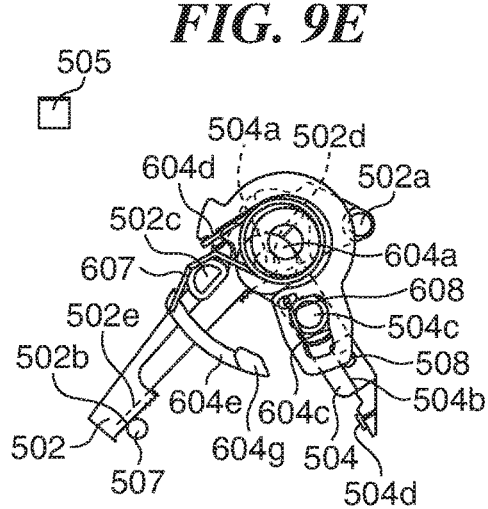

FIG. 9E is a cross-sectional view taken along e-e in FIG. 9A. FIG. 9E shows the relationship between the main mirror holder 502 and the sub mirror holder 504, and the mirror drive lever unit 700 (the mirror drive lever 604, the mirror drive gear 605, and the springs 607 and 608), immediately after the mirror drive unit 1000 has started mirror-up driving.

In the state shown in FIG. 9E, the spring 607 urges the shaft portion 502c of the main mirror holder 502, whereby the first contact portion 502b of the main mirror holder 502 is brought into contact with the positioning shaft 507. Further, the spring 608 urges the drive shaft portion 504c of the sub mirror holder 504, whereby the first contact portion 504b of the sub mirror holder 504 are brought into contact with the positioning shaft 508. When mirror-up driving by the mirror drive unit 1000 progresses from the state shown in FIGS. 9A to 9E, the state shown in FIGS. 9A to 9E shifts to a state shown in FIGS. 10A to 10E.

Figure 10A:
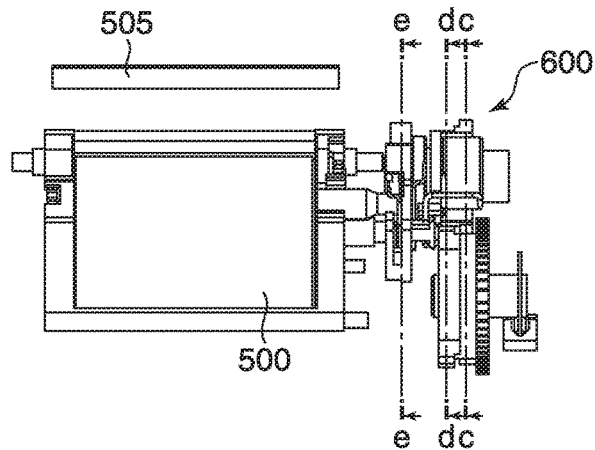
FIGS. 10A to 10E are views useful in explaining states of the components of the mirror drive unit immediately before the mirror unit starts a mirror-up operation.
Figure 10B:
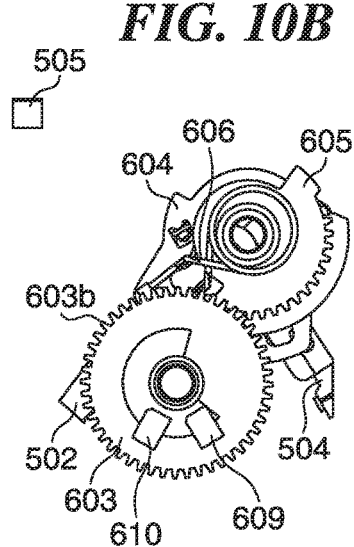

FIGS. 10A to 10E are views useful in explaining states of the components of the mirror drive unit 1000 immediately before the mirror unit 500 starts a mirror-up operation. FIG. 10A is a front view showing a state immediately before the mirror unit 500 starts the mirror-up operation, which corresponds to FIG. 8A. FIG. 10B is a right side view of FIG. 10A. FIG. 10B shows the relationship between the light shielding plate 603f of the cam gear 603 and the photo-interrupters 609 and 610, immediately before the mirror unit 500 starts the mirror-up operation.

As shown in FIG. 10B, the cam gear 603 is further rotated in the counterclockwise direction as viewed in FIG. 10B from the state shown in FIGS. 9A to 9E. In this state, the photo-interrupters 609 and 610 are both shielded from light by the light shielding plate 603f of the cam gear 603, thereby continuing to be in the non-light-receiving state. At this time, as described above, the MPU 100 determines via the mirror drive circuit 101 that the mirror unit 500 has not completed the mirror-down operate ion or the mirror-up operation.

Figure 10C:
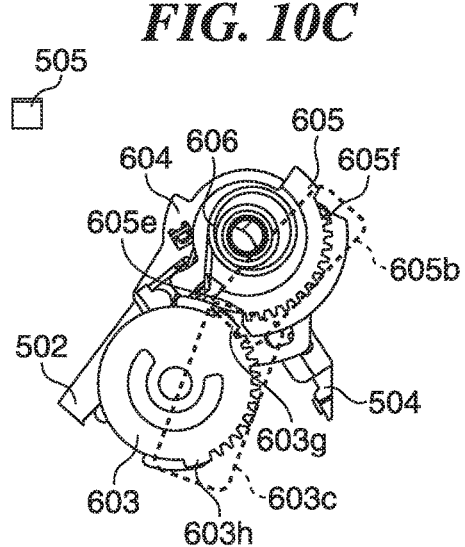

FIG. 10C is a cross-sectional view taken along c-c in FIG. 10A. FIG. 10C shows the relationship between the first cam portion 603d of the cam gear 603 and the first follower portion 605c of the mirror drive gear 605 immediately before the mirror unit 500 starts the mirror-up operation.

In the state shown in FIG. 10C, the second gear portion 603c of the cam gear 603 and the gear portion 605b of the mirror drive gear 605 are meshed with each other. With this, when the cam gear 603 is rotated in the mirror-up direction (counterclockwise direction as viewed in FIG. 10C), the mirror drive lever unit 700 is also rotated in the mirror-up direction (clockwise direction as viewed in FIG. 10C).

Further, at this time, the gear portion. 605b of the mirror drive gear 605 starts to be meshed with the second gear portion 603c, from the first gear tooth 603g of the cam gear 603. The first gear tooth 603g of the cam gear 603 is larger in width in the circumferential direction than the other teeth of the second gear portion 603c. This improves the gear strength of the second gear portion 603c of the cam gear 603.

Figure 10D:
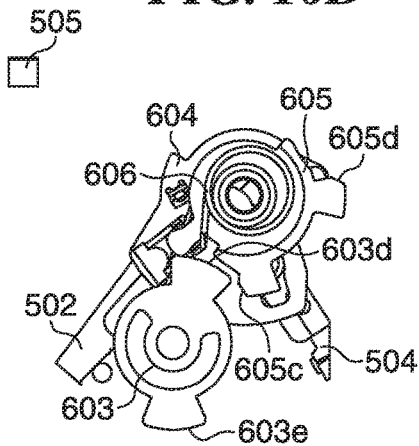

FIG. 10D is a cross-sectional view taken along d-d in FIG. 10A. FIG. 10D shows the relationship between the first cam portion 603d and the second cam portion 603e of the cam gear 603, and the first follower portion 605c and the second follower portion 605d of the mirror drive gear 605 immediately before the mirror unit 500 starts the mirror-up operation.

In the state shown in FIG. 10D, the contact state between the first cam portion 603d of the cam gear 603 and the first follower portion 605c of the mirror drive gear 605 is released. That is, the mirror unit 500 is released from the locked state in the mirror-down position.

Figure 10E:
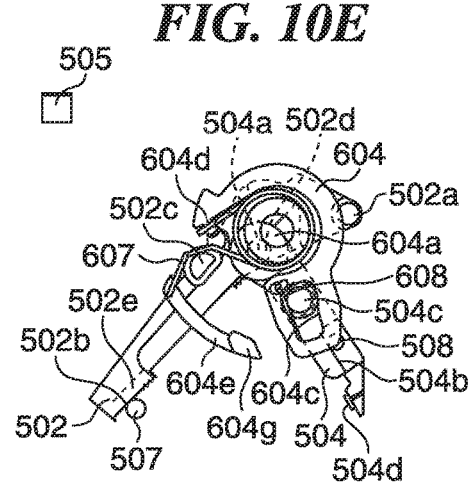

FIG. 10E is a cross-sectional view taken along e-e in FIG. 10A. FIG. 10E shows the relationship between the main mirror holder 502 and the sub mirror holder 504, and the mirror drive lever unit 700 (the mirror drive lever 604, the mirror drive gear 605, and the springs 607 and 608), immediately before the mirror unit 500 starts the mirror-up operation.

In the state shown in FIG. 10E, the spring 607 urges the shaft portion 502c of the main mirror holder 502, whereby the first contact portion 502b of the main mirror holder 502 is brought into contact with the positioning shaft 507.

Here, a region in which when the main mirror holder 502 is in a state in the mirror-down position, the sub mirror holder 504 is moved in the mirror-up direction to a position where the sub mirror holder 504 is overlaid on the main mirror holder 502 (region from FIGS. 8A to 8E to FIGS. 12A to 12E) is referred to as a first region. Further, a region in which the main mirror holder 502 and the sub mirror holder 504 are moved to the mirror-up position in a state overlaid upon each other (region from FIGS. 12A to 12E to FIGS. 14A to 14E) is referred to as a second region.

In the state shown in FIG. 10E when in the first region, the spring 608 urges the drive shaft portion 504c of the sub mirror holder 504, whereby the first contact portion 504b of the sub mirror holder 504 is brought into contact with the positioning shaft 508. When mirror-up driving of the mirror drive unit 1000 progresses from the state shown in FIGS. 10A to 10E, the state shown in FIGS. 10A to 10E shifts to a state shown in FIGS. 11A to 11E.

Figure 11A:
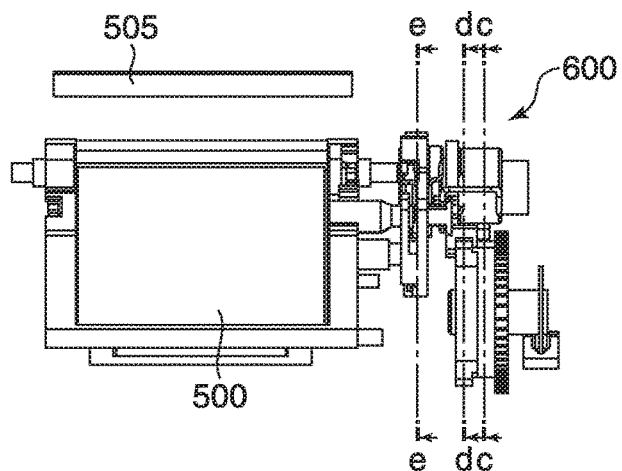
FIGS. 11A to 11E are views useful in explaining states of the components of the mirror drive unit when a sub mirror holder is performing its mirror-up operation.
Figure 11B:
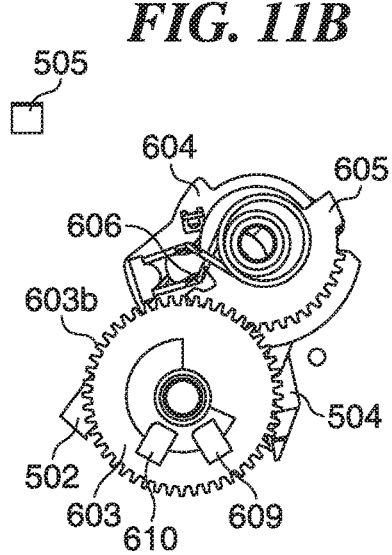

FIGS. 11A to 11E are views useful in explaining states of the components of the mirror drive unit 1000 when the sub mirror holder 504 is performing its mirror-up operation. FIG. 11A is a front view showing a state in which the sub mirror holder 504 is performing its mirror-up operation, which corresponds to FIG. 8A. FIG. 11B is a right side view of FIG. 11A. FIG. 11B shows the relationship between the light shielding plate 603f of the cam gear 603 and the photo-interrupters 609 and 610 when the sub mirror holder 504 is performing its mirror-up operation.

As shown in FIG. 11B, the cam gear 603 is further rotated in the counterclockwise direction from the state shown in FIGS. 10A to 10E. In this state, the photo-interrupters 609 and 610 are both shielded from light by the light shielding plate 603f of the cam gear 603, thereby continuing to be in the non-light-receiving state. At this time, as mentioned above, the MPU 100 determines via the mirror drive circuit 101 that the mirror unit 500 has not completed the mirror-down operation or the mirror-up operation.

Figure 11C:
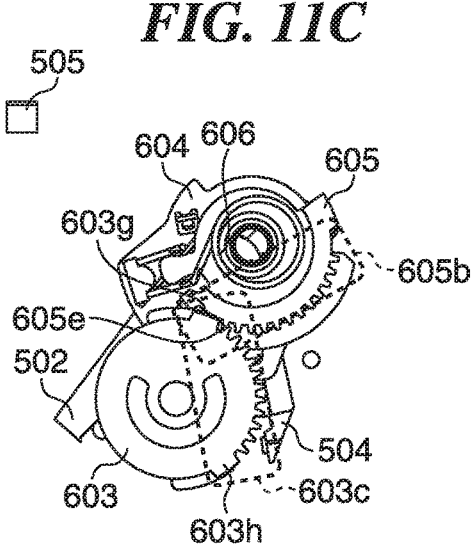

FIG. 11C is a cross-sectional view taken along c-c in FIG. 11A. FIG. 11C shows the relationship between the second gear portion 603c of the cam gear 603 and the gear portion 605b of the mirror drive gear 605 when the sub mirror holder 504 is performing its mirror-up operation.

In the state shown in FIG. 11C, the second gear portion 603c of the cam gear 603 and the gear portion 605b of the mirror drive gear 605 are meshed with each other. Therefore, the driving force of the motor 601 is transmitted to the mirror drive lever unit 700 via the cam gear 603, whereby the mirror drive lever unit 700 is rotated in the mirror-up direction (clockwise direction as viewed in FIG. 11C) from the state shown in FIGS. 10A to 10E.

Figure 11D:
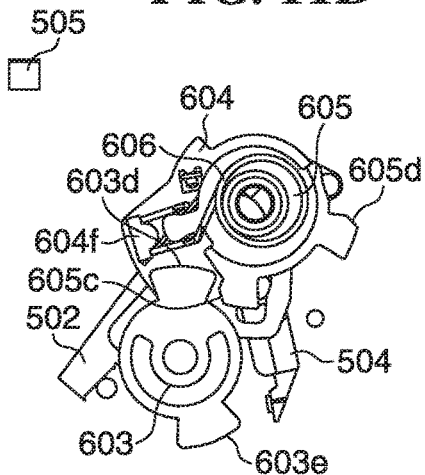

FIG. 11D is a cross-sectional view taken along d-d in FIG. 11A. FIG. 11D shows the relationship between the first cam portion 603d and the second cam portion 603e of the cam gear 603, and the first follower portion 605c and the second follower portion 605d of the mirror drive gear 605, when the sub mirror holder 504 is performing its mirror-up operation.

In the state shown in FIG. 11D, the first cam portion 603d of the cam gear 603 and the first follower portion 605c of the mirror drive gear 605 are not in contact with each other. Further, the second cam portion 603e of the cam gear 603 and the second follower portion 605d of the mirror drive gear 605 are not in contact with each other, either.

Figure 11E:
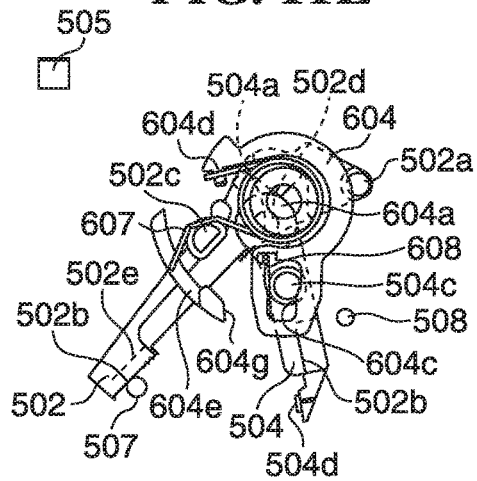

FIG. 11E is a cross-sectional view taken along e-e in FIG. 11A. FIG. 11E shows the relationship between the main mirror holder 502 and the sub mirror holder 504, and the mirror drive lever unit 700 (the mirror drive lever 604, the mirror drive gear 605, and the springs 607 and 608), when the sub mirror holder 504 is performing its mirror-up operation.

In the state shown in FIG. 11E, the inner peripheral surface of the rectangular hole 604c of the mirror drive lever 604 is brought into contact, with the drive shaft portion 504c of the sub mirror holder 504, whereby the sub mirror holder 504 is rotated in a direction in which the sub mirror holder 504 is closed to the main mirror holder 502 (mirror-up direction). Further, the spring 608 urges the drive shaft portion 504c of the sub mirror holder 504. The shaft portion 502c of the main mirror holder 502 continues to be in the state urged by the spring 607, and hence the main mirror holder 502 continues to be in the mirror-down state. When mirror-up driving of the mirror drive unit 1000 progresses from the state shown in FIG. 11A to 11E, the state shown in FIG. 11A to 11E shifts to a state shown in FIGS. 12A to 12E.

Figure 12A:
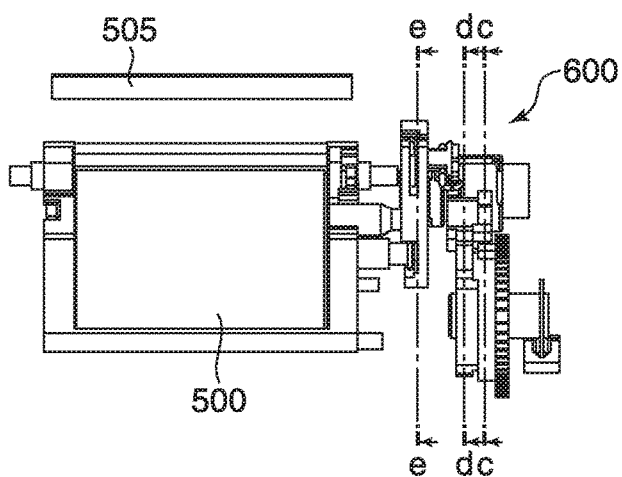
FIGS. 12A to 12E are views useful in explaining states of the components of the mirror drive unit when a main mirror holder starts its mirror-up operation.
Figure 12B:
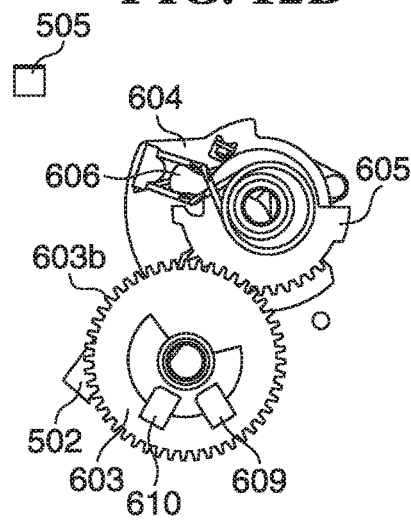

FIGS. 12A to 12E are views useful in explaining states of the components of the mirror drive unit 1000 when the main mirror holder 502 starts its mirror-up operation. FIG. 12A is a front view showing a state at the moment when the main mirror holder 502 starts its mirror-up operation, which corresponds to FIG. 8A. FIG. 12B is a right side view of FIG. 12A. FIG. 12B shows the relationship between the light shielding plate 603f of the cam gear 603 and the photo-interrupters 609 and 610 when the main mirror holder 502 starts its mirror-up operation.

As shown in FIG. 12B, the cam gear 603 is further rotated in the counterclockwise direction from the state shown in FIGS. 11A to 11E. In this state, the photo-interrupters 609 and 610 are both shielded from light by the light shielding plate 603f of the cam gear 603, continuing to be in the non-light-receiving state. At this time, as mentioned above, the MPU 100 determines via the mirror drive circuit 101 that the mirror unit 500 has not completed the mirror-down operation or the mirror-up operation.

Figure 12C:
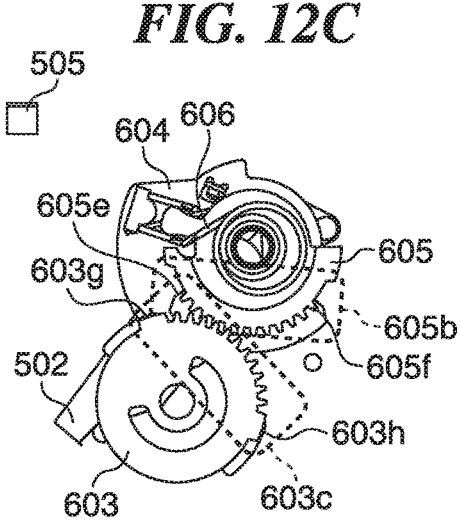

FIG. 12C is a cross-sectional view taken along c-c in FIG. 12A. FIG. 12C shows the relationship between the second gear portion 603c of the cam gear 603 and the gear portion 605b of the mirror drive gear 605 at the moment when the main mirror holder 502 starts its mirror-up operation.

In the state shown in FIG. 12C, the second gear portion 603c of the cam gear 603 and the gear portion 605b of the mirror drive gear 605 are in mesh with each other. Therefore, the driving force of the motor 601 is transmitted to the mirror drive lever unit 700 via the cam gear 603, whereby the mirror drive lever unit 700 is further rotated in the mirror-up direction (clockwise direction as viewed in FIG. 12C) from the state shown in FIGS. 11A to 11E.

Figure 12D:
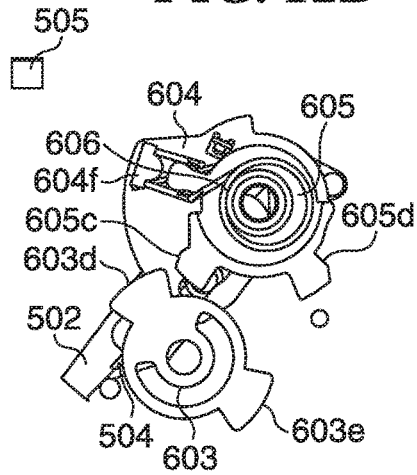

FIG. 12D is a cross-sectional view taken along d-d in FIG. 12A. FIG. 12D shows the relationship between the first cam portion 603d and the second cam portion 603e of the cam gear 603, and the first follower portion 605c and the second follower portion 605d of the mirror drive gear 605 at the moment when the main mirror holder 502 starts its mirror-up operation.

In the state shown in FIG. 12D, the first cam portion 603d of the cam gear 603 and the first follower portion 605c of the mirror drive gear 605 are not in contact with each other. Further, the second cam portion 603e of the cam gear 603 and the second follower portion 605d of the mirror drive gear 605 are not in contact with each other, either.

Figure 12E:
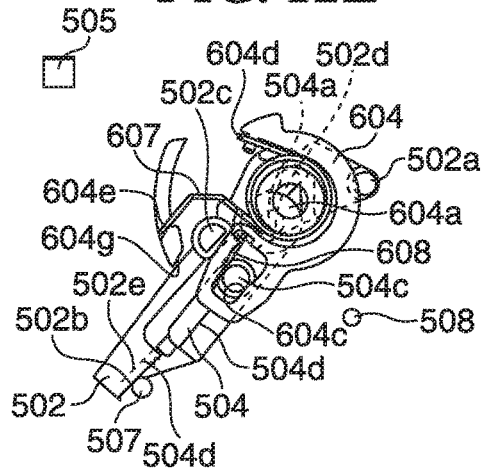

FIG. 12E is a cross-sectional view taken along e-e in FIG. 12A. FIG. 12E shows the relationship between the main mirror holder 502 and the sub mirror holder 504, and the mirror drive lever unit 700 (the mirror drive lever 604, the mirror drive gear 605, and the springs 607 and 608), at the moment when the main mirror holder 502 starts its mirror-up operation.

In the state shown in FIG. 12E, the inner peripheral surface of the rectangular hole 604c of the mirror drive lever 604 is in contact with the drive shaft portion 504c of the sub mirror holder 504, whereby the sub mirror holder 504 is rotated in the direction in which the sub mirror holder 504 is closed to the main mirror holder 502 (mirror-up direction), to be placed in a state overlaid on the main mirror holder 502. The spring 607 is pressed and urged by a spring urging portion 604e of the mirror drive lever 604. In this state, the shaft portion 502c of the main mirror holder 502 is not in contact with the spring 607, and is not urged by the spring 607. This makes it possible to reduce the load of the mirror-up operation for rotating the main mirror holder 502 in the mirror-up direction. The spring urging portion 604e corresponds to an example of a third hook portion, and the drive shaft portion 504c corresponds to an example of a sixth hook portion.

Further, a second contact portion 502e of the main mirror holder 502 is in contact with a second contact portion 504d of the sub mirror holder 504. The main mirror holder 502 is rotated in the mirror-up direction by being pushed up by the sub mirror holder 504. At this time, the down lever portion 604g of the mirror drive lever 604 passes outside the rotation locus of the shaft portion 502c of the main mirror holder 502. When mirror-up driving of the mirror drive unit 1000 progresses from the state shown in FIGS. 12A to 12E, the state shown FIGS. 12A to 12E shifts to a state shown in FIGS. 13A to 13E.

Figure 13A:
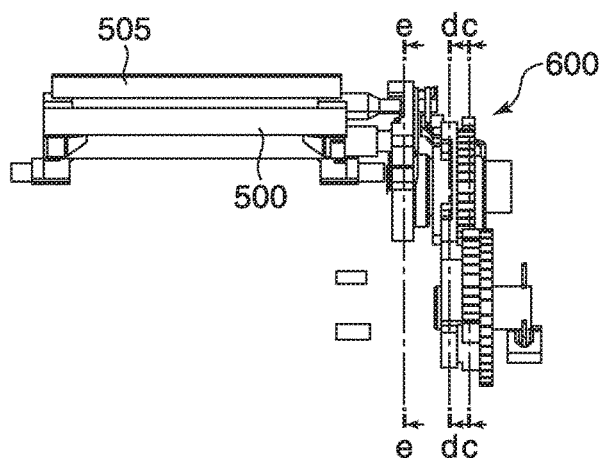
FIGS. 13A to 13E are views useful in explaining states of the components of the mirror drive unit immediately before the mirror unit completes the mirror-up operation.
Figure 13B:
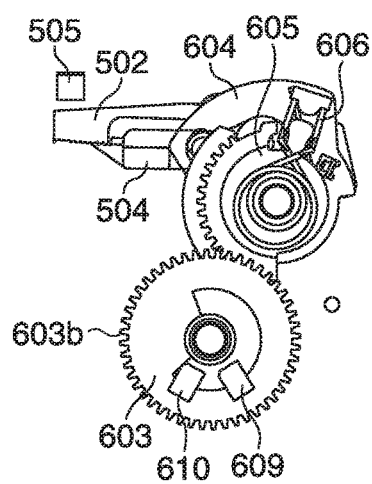

FIGS. 13A to 13E are views useful in explaining states of the components of the mirror drive unit 1000 immediately before the mirror unit 500 completes the mirror-up operation. FIG. 13A is a front view showing a state immediately before the mirror unit 500 completes the mirror-up operation, which corresponds to FIG. 8A. FIG. 13B is a right side view of FIG. 13A. FIG. 13B shows the relationship between the light shielding plate 603f of the cam gear 603 and the photo-interrupters 609 and 610 immediately before the mirror unit 500 completes the mirror-up operation.

As shown in FIG. 13B, the cam gear 603 is further rotated in the counterclockwise direction from the state shown in FIGS. 12A to 12E. In this state, the photo-interrupters 609 and 610 are both shielded from light by the light shielding plate 603f of the cam gear 603, continuing to be in the non-light-receiving state. At this time, as mentioned above, the MPU 100 determines via the mirror drive circuit 101 that the mirror unit 500 has not completed the mirror-down operation or the mirror-up operation.

Figure 13C:
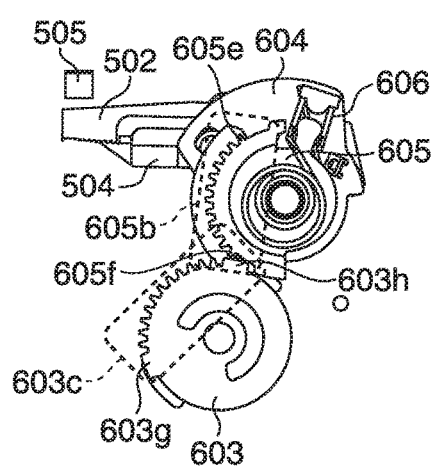

FIG. 13C a cross-sectional view taken along c-c in FIG. 13A. FIG. 13C shows the relationship between the second gear portion 603c of the cam gear 603 and the gear portion 605b of the mirror drive gear 605 immediately before the mirror unit 500 completes the mirror-up operation. In the state shown in FIG. 13C, the second gear portion 603c of the cam gear 603 and the gear portion 605b of the mirror drive gear 605 are released from the meshed state, to enter a non-meshed state.

Figure 13D:
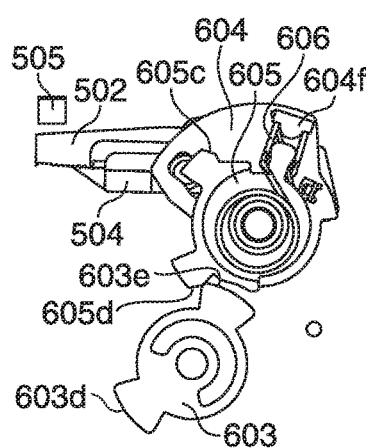

FIG. 13D is a cross-sectional view taken along d-d in FIG. 13A. FIG. 13D shows the relationship between the first cam portion 603d and the second cam portion 603e of the cam gear 603, and the first follower portion 605c and the second follower portion 605d of the mirror drive gear 605, immediately before the mirror unit 500 completes the mirror-up operation.

In the state shown in FIG. 13D, the second cam portion 603e of the cam gear 603 is in contact with the second follower portion 605d of the mirror drive gear 605, and the cam gear 603 is rotated in the counterclockwise direction to thereby push up the mirror drive gear 605 in the mirror-up direction. This causes the mirror drive lever unit 700 to rotate in the mirror-up direction. Further, the first cam portion 603d of the cam gear 603 is not in contact with the first follower portion 605c of the mirror drive gear 605.

Figure 13E:
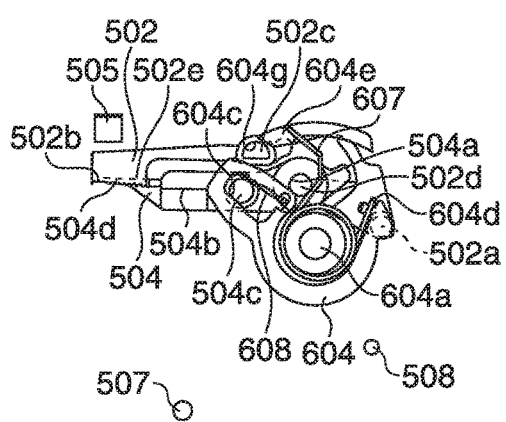

FIG. 13E is a cross-sectional view taken along e-e in FIG. 13A. FIG. 13E shows the relationship between the main mirror holder 502 and the sub mirror holder 504, and the mirror drive lever unit 700 (the mirror drive lever 604, the mirror drive gear 605, and the springs 607 and 608), immediately before the mirror unit 500 completes the mirror-up operation.

In the state shown in FIG. 13E, the drive shaft portion 504c of the sub mirror holder 504 is in contact with the inner peripheral surface of the rectangular hole 604c of the mirror drive lever 604, and the sub mirror holder 504 performs the mirror-up operation. Further, the second contact portion 502e of the main mirror holder 502 is in contact with the second contact portion 504d of the sub mirror holder 504, whereby the main mirror holder 502 performs the mirror-up operation by being pushed up by the sub mirror holder 504.

At this time, the down lever portion 604g of the mirror drive lever 604 enters the rotation locus of the shaft portion 502c of the main mirror holder 502. In a case where the main mirror holder 502 is moved away from the sub mirror holder 504, the shaft portion 502c of the main mirror holder 502 is brought into contact with the down lever portion 604g of the mirror drive lever 604. When mirror-up driving of the mirror drive unit 1000 progresses from the state shown in FIGS. 13A to 13E, the state shown in FIGS. 13A to 13E shifts to a state shown in FIGS. 14A to 14E.

Figure 14A:
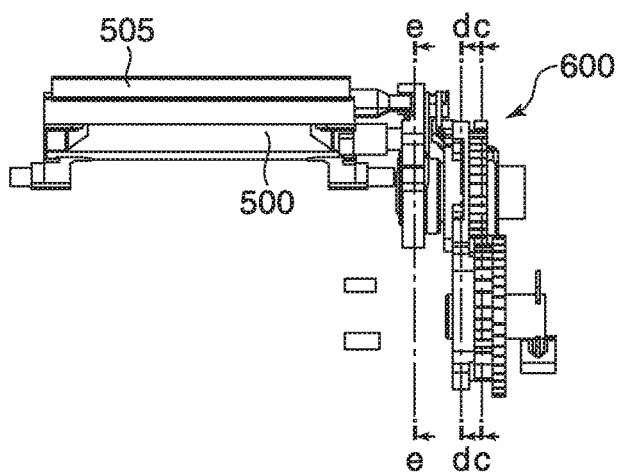
FIGS. 14A to 14E are views useful in explaining states of the components of the mirror drive unit when the mirror unit is in the mirror-up position.
Figure 14B:
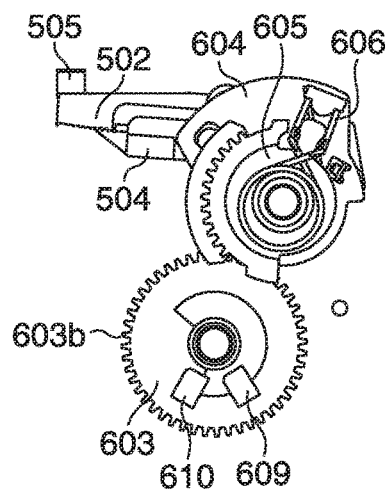

FIGS. 14A to 14E are views useful in explaining states of the components of the mirror drive unit 1000 when the mirror unit 500 is in the mirror-up position. FIG. 14A is a front view showing a state when the mirror unit 500 is in the mirror-up position, which corresponds to FIG. 8A. FIG. 14B is a right side view of FIG. 14A. FIG. 14B shows the relationship between the light shielding plate 603f of the cam gear 603 and the photo-interrupters 609 and 610 when the mirror unit 500 is in the mirror-up position.

In the state shown in FIG. 14B, the cam ear 603 is further rotated in the counterclockwise direction from the state shown in FIGS. 13A to 13E. In this state, the photo-interrupter 609 is shielded from light by the light shielding plate 603f of the cam gear 603, continuing to be in the non-light-receiving state, and the photo-interrupter 610 is released from the state shielded from light by the light shielding plate 603f of the cam gear 603 to enter the light-receiving state.

At this time, the MPU 100 determines via the mirror drive circuit 101 that the mirror unit 500 has completed the mirror-up operation, and terminates mirror-up driving of the mirror drive unit 1000.

Figure 14C:
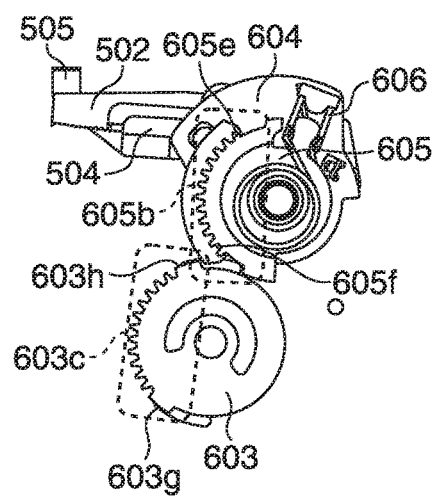

FIG. 14C is a cross-sectional view taken along c-c in FIG. 14A. FIG. 14C shows the relationship between the second gear portion 603c of the cam gear 603 and the gear portion 605b of the mirror drive gear 605 when the mirror unit 500 is in the mirror-up position. In the state shown in FIG. 14C, the second gear portion 603c of the cam gear 603 is not in mesh with the gear portion 605b of the mirror drive gear 605.

Figure 14D:
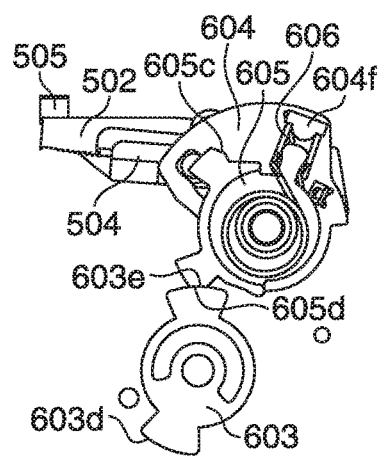

FIG. 14D is a cross-sectional view taken along d-d in FIG. 14A. FIG. 14D shows the relationship between the first cam portion 603d and the second cam portion 603e of the cam gear 603, and the first follower portion 605c and the second follower portion 605d of the mirror drive gear 605, when the mirror unit 500 is in the mirror-up position.

In the state shown in FIG. 14D, the second follower portion 605d of the mirror drive gear 605 is in contact, in the urged state, with the second cam portion 603e of the cam gear 603. The second cam portion 603e of the cam gear 603 has a circular arc cam shape concentric with the part of the cam gear 603 without a cam lift, as mentioned above. Therefore, even when the cam gear 603 is rotated to some degree in the cam area of the first cam portion 603d in this state, rotation is not transmitted to the mirror drive gear 605, so that the mirror drive gear 605 is not rotated.

Further, in this state, when the mirror drive gear 605 is brought into contact with the cam gear 603 a state urged in the mirror-down direction, the mirror drive gear 605 is brought into contact with the cam gear 603 such that the urging force acts in a direction substantially toward the center of rotation of the cam gear 603. Therefore, in this state, unless the cam gear 603 is rotated, the mirror drive gear 605 is restricted from rotating in the mirror-down direction. This causes the mirror unit 500 to be locked in the mirror-up position.

Figure 14E:
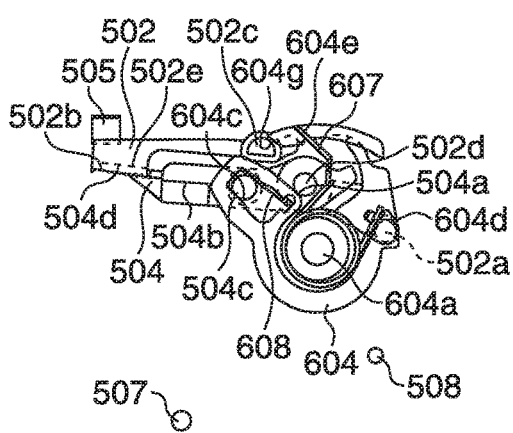

FIG. 14E is a cross-sectional view taken along e-e in FIG. 14A. FIG. 14E shows the relationship between the main mirror holder 502 and the sub mirror holder 504, and the mirror drive lever unit 700 (the mirror drive lever 604, the mirror drive gear 605, and the springs 607 and 608), when the mirror unit 500 is in the mirror-up position.

In the state shown in FIG. 14E, the drive shaft portion 504c of the sub mirror holder 504 is in contact with the inner peripheral surface of the rectangular hole 604c of the mirror drive lever 604, and the second contact portion 502e of the main mirror holder 502 is in contact with the second contact portion 504d of the sub mirror holder 504.

The main mirror holder 502 is in contact with the stopper 505 in a state in which the front end portion thereof elastically deforms the stopper 505. This causes the main mirror holder 502 to receive the urging force in the mirror-down direction, and the second follower portion 605d of the mirror drive gear 605 to be brought into contact with the second cam portion 603e of the cam gear 603.

Further, in this state, the mirror drive lever 604 receives the urging force in the mirror-up direction, and the mirror unit 500 is also pushed in the mirror-up direction. At this time, the down lever portion 604g of the mirror drive lever 604 is not in contact with the shaft portion 502c of the main mirror holder 502, and is on standby within the rotation locus of the shaft portion 502c of the main mirror holder 502. When the motor 601 rotates in the mirror-down direction (clockwise direction as viewed from the pinion 602) in the state shown in FIGS. 14A to 14E, and the mirror drive unit 1000 starts mirror-down driving, the state shown in FIGS. 14A to 14E shifts to a state shown in FIGS. 15A to 15E.

FIGS. 15A to 15E are views useful in explaining states of the components of the mirror drive unit 1000 immediately after the mirror drive unit 1000 starts mirror-down driving. FIGS. 15A to 15E show a state immediately after driving of the motor 601 has been started to move the main mirror holder 502 and the sub mirror holder 504 from the mirror-up position toward the mirror-down position.

FIG. 15A is a front view showing a state immediately after the mirror drive unit 1000 has started mirror-down driving, which corresponds to FIG. 8A. FIG. 15B is a right side view of FIG. 15A. FIG. 15B shows the relationship between the light shielding plate 603f of the cam gear 603 and the photo-interrupters 609 and 610 immediately after the mirror drive unit 1000 has started mirror-down driving.

In the state shown in FIG. 15B, the cam gear 603 is rotated in the mirror-down direction (clockwise direction as viewed in FIG. 15B), and the photo-interrupter 610 is shielded from light by the light shielding plate 603f of the cam gear 603, so that the state of the photo-interrupter 610 is changed from the light-receiving state to the non-light-receiving state. The photo-interrupter 609 is shielded from light by the light shielding plate 603f of the cam gear 603, continuing to be in the non-light-receiving state.

When the state of the photo-interrupter 610 is changed from the light-receiving state to the non-light-receiving state, the MPU 100 determines via the mirror drive circuit 101 that the mirror unit 500 has not completed the mirror-down operation or the mirror-up operation.

FIG. 15C is a cross-sectional view taken along c-c in FIG. 15A. FIG. 15C shows the relationship between the second gear portion 603c of the cam gear 603 and the gear portion 605b of the mirror drive gear 605 immediately after the mirror drive unit 1000 has started mirror-down driving.

In the state shown in FIG. 15C, a second gear tooth 603h of the cam gear 603 enters inside the gear outer circle of the gear portion 605b of the mirror drive gear 605. At this time, as described hereinafter with reference to FIG. 15D, the second follower portion 605d of the mirror drive gear 605 is in contact with the second cam portion 603e of the cam gear 603, whereby the mirror drive gear 605 is restricted from rotating in the mirror-down direction. Therefore, a second gear tooth 605f of the mirror drive gear 605 is positioned outside the gear outer circle of the second gear portion 603c of the cam gear 603. This enables the second gear portion 603c of the cam gear 603 and the gear portion 605b of the mirror drive gear 605 to stably shift to a meshed state.

FIG. 15D is a cross-sectional view taken along d-d in FIG. 15A. FIG. 15D shows the relationship between the first cam portion 603d and the second cam portion 603e of the cam gear 603, and the first follower portion 605c and the second follower portion 605d of the mirror drive gear 605, immediately after the mirror drive unit 1000 has started mirror-down driving. In the state shown in FIG. 15D, the second cam portion 603e of the cam gear 603 is in contact with the second follower portion 605d of the mirror drive gear 605.

FIG. 15E is a cross-sectional view taken along e-e in FIG. 15A. FIG. 15E shows the relationship between the main mirror holder 502 and the sub mirror holder 504, and the mirror drive lever unit 700 (the mirror drive lever 604, the mirror drive gear 605, and the springs 607 and 608), immediately after the mirror drive unit 1000 has started mirror-down driving.

In the state shown in FIG. 15E, the drive shaft portion 504c of the sub mirror holder 504 is in contact with inner peripheral surface of the rectangular hole 604c of the mirror drive lever 604, and the second contact portion 502e of the main mirror holder 502 is in contact with the second contact portion 504d of the sub mirror holder 504.

FIGS. 16A to 16E are views useful in explaining states of the components of the mirror drive unit 1000 immediately before the mirror unit 500 starts the mirror-down operation. FIGS. 16A to 16E show a state immediately after driving of the mirror drive lever 604 has been started to move the main mirror holder 502 and the sub mirror holder 504 from the mirror-up position toward the mirror-down position.

Figure 16A:
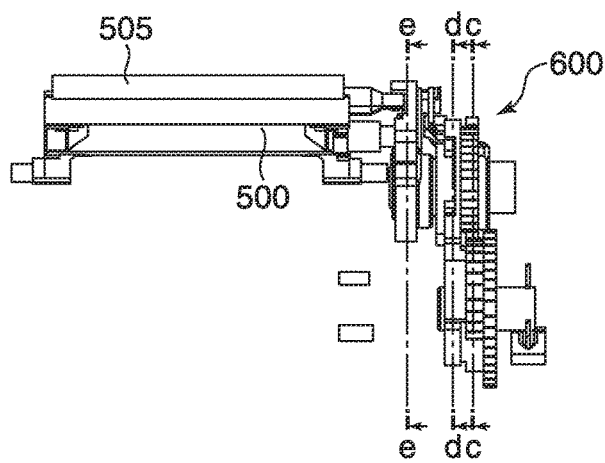
FIGS. 16A to 16E are views useful in explaining states of the components of the mirror drive unit immediately before the mirror unit starts a mirror-down operation.
Figure 16B:
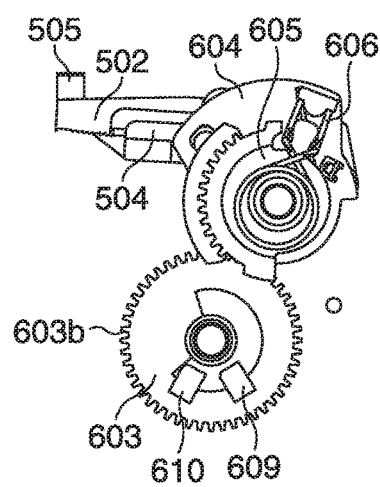

FIG. 16A is a front view showing a state immediately before the mirror unit 500 starts the mirror-down operation, which corresponds to FIG. 8A. FIG. 16B is a right side view of FIG. 16A. FIG. 16B shows the relationship between the light shielding plate 603f of the cam gear 603 and the photo-interrupters 609 and 610 immediately before the mirror unit 500 starts the mirror-down operation.

As shown in FIG. 16B, the cam gear 603 is further rotated in the clockwise direction from the state shown in FIGS. 15A to 15E. In this state, the photo-interrupters 609 and 610 are both shielded from light by the light shielding plate 603f of the cam gear 603, and are in the non-light-receiving state. At this time, as mentioned above, the MPU 100 determines via the mirror drive circuit 101 that the mirror unit 500 has not completed the mirror-down operation or the mirror-up operation.

Figure 16C:
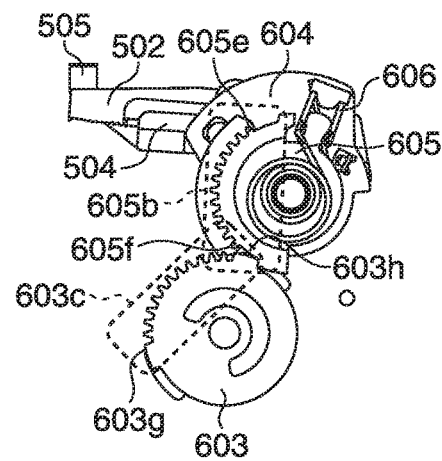

FIG. 16C is a cross-sectional view taken along c-c in FIG. 16A. FIG. 16C shows the relationship between the second gear portion 603c of the cam gear 603 and the gear portion 605h of the mirror drive gear 605 immediately before the mirror unit 500 starts the mirror-down operation.

In the state shown in FIG. 16C, the second gear portion 603c of the cam gear 603 and the gear portion 605b of the mirror drive gear 605 are shifted to the meshed state. With this, when the cam gear 603 is rotated in the mirror-down direction (clockwise direction as viewed in FIG. 16C), the mirror drive lever unit 700 is also rotated in the mirror-down direction (counterclockwise direction as viewed in FIG. 16C).

At this time, the second gear portion. 603c of the cam gear 603 starts to be meshed with the gear portion 605b of the mirror drive gear 605 from the second gear tooth 605f of the mirror drive gear 605. The second gear tooth 603h of the cam gear 603 is larger in width in the circumferential direction than the other teeth of the second gear portion 603c. This improves the gear strength of the second gear portion 603c of the cam gear 603.

Figure 16D:
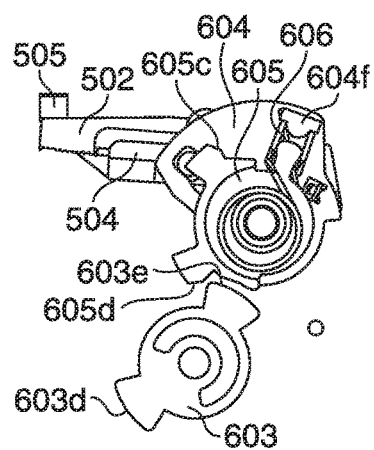

FIG. 16D is a cross-sectional view taken along d-d in FIG. 16A. FIG. 16D shows the relationship between the first cam portion 603d and the second cam portion 603e of the cam gear 603, and the first follower portion 605c and the second follower portion 605d of the mirror drive gear 605, immediately before the mirror unit 500 starts the mirror-down operation. In the state shown in FIG. 16D, the contact state between the second cam portion 603e of the cam gear 603 and the second follower portion 605d of the mirror drive gear 605 is released.

Figure 16E:
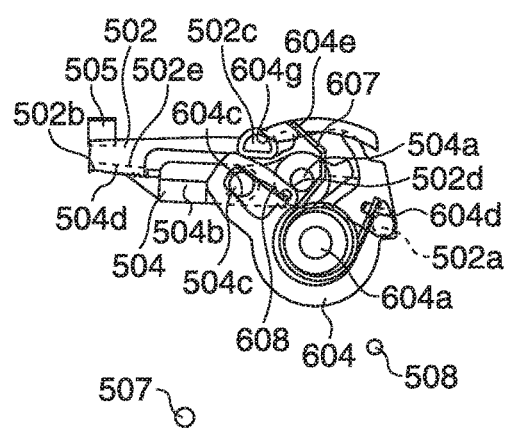

FIG. 16E is a cross-sectional view taken along e-e in FIG. 16A. FIG. 16E shows the relationship between the main mirror holder 502 and the sub mirror holder 504, and the mirror drive lever unit 700 (the mirror drive lever 604, the mirror drive gear 605, and the springs 607 and 608), immediately before the mirror unit 500 starts the mirror-down operation.

In the state shown in FIG. 16E, the inner peripheral surface of the rectangular hole 604c of the mirror drive lever 604 is in contact with the drive shaft portion 504c of the sub mirror holder 504, and the down lever portion 604g of the mirror drive lever 604 is in contact with the shaft portion 502c of the main mirror holder 502. With this, when the mirror drive lever 604 is rotated in the mirror-down direction, the sub mirror holder 504 and the main mirror holder 502 can quickly rotate in the mirror-down direction. Therefore, it is possible to reduce the time required for the main mirror 501 to reach the mirror-down position, which makes it possible to reduce time over which an object image is lost during finder observation. When mirror-down driving of the mirror drive unit 1000 progresses from the state shown in FIGS. 16A to 16E, the state shown in FIGS. 16A to 16E shifts to a state shown in FIGS. 17A to 17E.

FIGS. 17A to 17E are views useful in explaining states of the components of the mirror drive unit 1000 when the main mirror holder 502 reaches its mirror-down position. FIG. 17A is a front view showing a state at the moment when the main mirror holder 502 reaches its mirror-down position, which corresponds to FIG. 8A. FIG. 17B is a right side view of FIG. 17A. FIG. 17B shows the relationship between the light shielding plate 603f of the cam gear 603 and the photo-interrupters 609 and 610 at the moment when the main mirror holder 502 reaches its mirror-down position.

In the state shown in FIG. 17B, the cam gear 603 is further rotated in the clockwise direction from the state shown in FIGS. 16A to 16E. In this state, the photo-interrupters 609 and 610 are both shielded from light by the light shielding plate 603f of the cam gear 603, and are in the non-light-receiving state. At this time, as mentioned above, the MPU 100 determines via the mirror drive circuit 101 that the mirror unit 500 has not completed the mirror-down operation or the mirror-up operation.

FIG. 17C is a cross-sectional view taken along c-c in FIG. 17A. FIG. 17C shows the relationship between the second gear portion 603c of the cam gear 603 and the gear portion 605b of the mirror drive gear 605 at the moment when the main mirror holder 502 reaches its mirror-down position.

In the state shown in FIG. 17C, the second gear portion 603c of the cam gear 603 is in mesh with the gear portion 605b of the mirror drive gear 605. Therefore, the driving force of the motor 601 is transmitted to the mirror drive lever unit 700 via the can gear 603, whereby the mirror drive lever unit 700 is rotated in the mirror-down direction (counterclockwise direction as viewed in FIG. 17C) from the state shown in FIGS. 16A to 16E.

FIG. 17D is a cross-sectional view taken along d-d in FIG. 17A. FIG. 17D shows the relationship between the first cam portion 603d and the second cam portion 603e of the cam gear 603, and the first follower portion 605c and the second follower portion 605d of the mirror drive gear 605 at the moment when the main mirror holder 502 reaches its mirror-down position.

In the state shown in FIG. 17D, the second cam portion 603e of the cam gear 603 and the second follower portion 605*d* of the mirror drive gear 605 are not in contact with each other. Further, the first cam portion 603*d* of the cam gear 603 and the first follower portion 605*c* of the mirror drive gear 605 are not in contact with each other, either.

FIG. 17E is a cross-sectional view taken along e-e in FIG. 17A. FIG. 17E shows the relationship between the main mirror holder 502 and the sub mirror holder 504, and the mirror drive lever unit 700 (the mirror drive lever 604, the mirror drive gear 605, and the springs 607 and 608), at the moment when the main mirror holder 502 reaches its mirror-down position.

In the state shown in FIG. 17E, the inner peripheral surface of the rectangular hole 604*c* of the mirror drive lever 604 is in contact with the drive shaft portion 504*c* of the sub mirror holder 504, whereby the sub mirror holder 504 is rotated in the mirror-down direction. At this time, the down lever portion 604*g* of the mirror drive lever 604 passes outside the rotation locus of the shaft portion 502*c* of the main mirror holder 502. In this state, the main mirror holder 502 is pulled down by the sub mirror holder 504 to thereby perform the mirror-down operation.

Further, the first contact portion 502*b* of the main mirror holder 502 is brought into contact with the positioning shaft 507, and when the main mirror holder 502 bounces after the contact, the main mirror holder 502 is rotated about the rotational shaft 502*a* in the mirror-up direction (clockwise direction as viewed in FIG. 17E). At this time, the shaft portion 502*c* of the main mirror holder 502 is brought into contact with the spring 607, to receive the urging force in the mirror-down direction. This suppresses the bounce of the main mirror holder 502.

As mentioned above, the inner peripheral surface of the rectangular hole 604*c* of the mirror drive lever 604 is in contact with the drive shaft portion 504*c* of the sub mirror holder 504, whereby the sub mirror holder 504 continues the mirror-down operation. When mirror-down driving of the mirror drive unit 1000 progresses from the state shown in FIGS. 17A to 17E, the state shown in FIGS. 17A to 17E shifts to a state shown in FIGS. 18A to 18E.

Figure 18A:
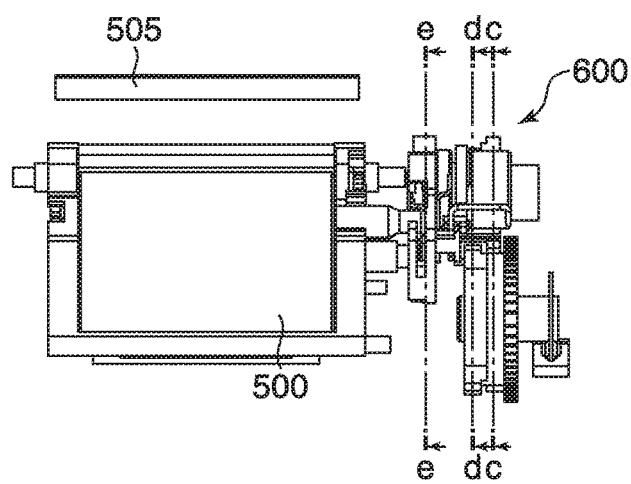
FIGS. 18A to 18E are views useful in explaining states of the components of the mirror drive unit immediately before the sub mirror holder reaches its mirror-down position.
Figure 18B:
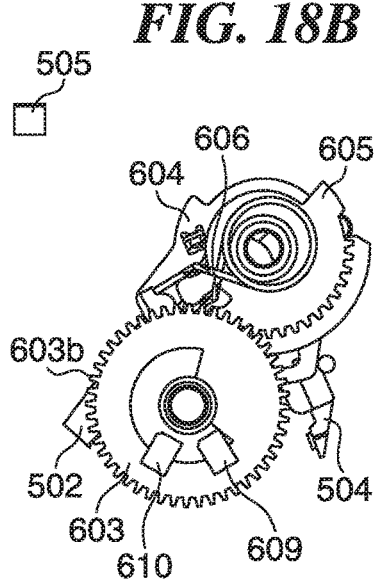

FIGS. 18A to 18E are views useful in explaining states of the components of the mirror drive unit 1000 immediately before the sub mirror holder 504 reaches its mirror-down position. FIG. 18A is a front view showing a state immediately before the sub mirror holder 504 reaches its mirror-down position, which corresponds to FIG. 8A. FIG. 18B is a right side view of FIG. 18A. FIG. 18B shows the relationship between the light shielding plate 603*f* of the cam gear 603 and the photo-interrupters 609 and 610 immediately before the sub mirror holder 504 reaches its mirror-down position.

In the state shown in FIG. 18B, the cam gear 603 is further rotated in the clockwise direction as viewed FIG. 18B from the state shown in FIGS. 17A to 17E. In this state, the photo-interrupters 609 and 610 are both shielded from light by the light shielding plate 603*f* of the cam gear 603, and are in the non-light-receiving state. At this time, as mentioned above, the MPU 100 determines via the mirror drive circuit 101 that the mirror unit 500 has not completed the mirror-down operation or the mirror-up operation.

Figure 18C:
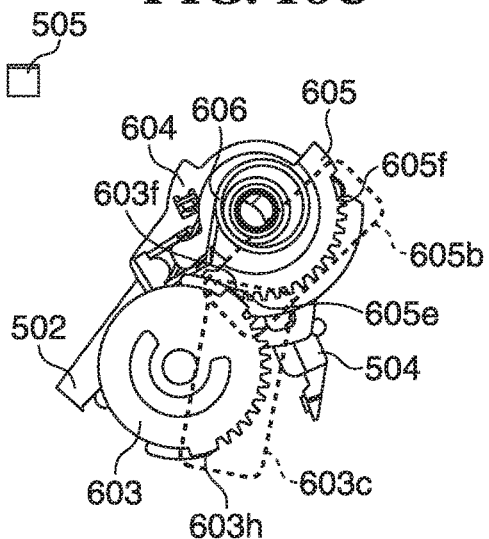

FIG. 18C is a cross-sectional view taken along c-c in FIG. 18A. FIG. 18C shows the relationship between the second gear portion 603*c* of the cam gear 603 and the gear portion 605*b* of the mirror drive gear 605 immediately before the sub mirror holder 504 reaches its mirror-down position. In the state shown in FIG. 18C, the second gear portion 603*c* of the cam gear 603 and the gear portion 605*b* of the mirror drive gear 605 are released from the meshed state, to enter a non-meshed state.

Figure 18D:
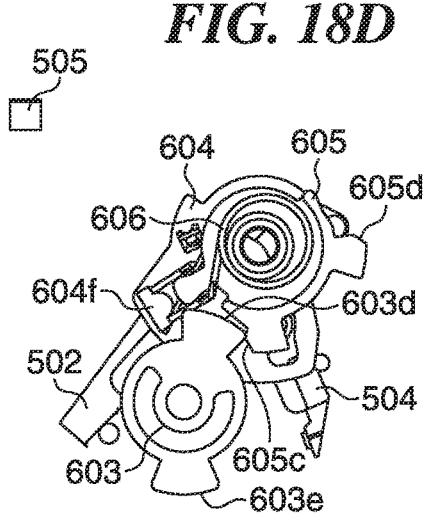

FIG. 18D is a cross-sectional view taken along d-d in FIG. 18A. FIG. 18D shows the relationship between the first cam portion 603*d* and the second cam portion 603*e* of the cam gear 603, and the first follower portion 605*c* and the second follower portion 605*d* of the mirror drive gear 605, immediately before the sub mirror holder 504 reaches its mirror-down position.

In the state shown in FIG. 18D, the first cam portion 603*d* of the cam gear 603 is brought into contact with the first follower portion 605*c* of the mirror drive gear 605, and pushes down the mirror drive gear 605 in the mirror-down direction (counterclockwise direction as viewed in FIG. 18D). This causes the mirror drive lever unit 700 to be rotated in the mirror-down direction. Further, the second cam portion 603*e* of the cam gear 603 is not in contact with the second follower portion 605*d* of the mirror drive gear 605.

Figure 18E:
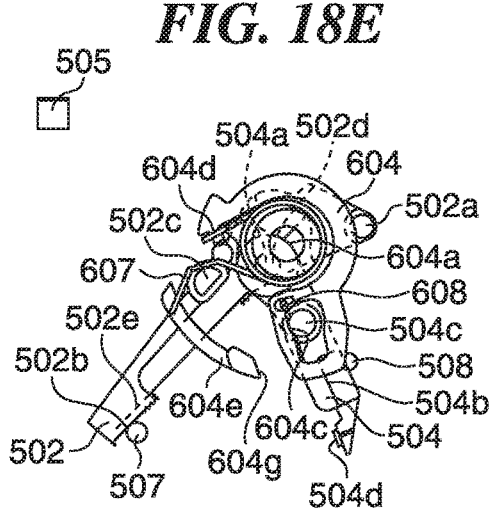

FIG. 18E is a cross-sectional view taken along e-e in FIG. 18A. FIG. 18E shows the relationship between the main mirror holder 502 and the sub mirror holder 504, and the mirror drive lever unit 700 (the mirror drive lever 604, the mirror drive gear 605, and the springs 607 and 608), immediately before the sub mirror holder 504 reaches its mirror-down position.

In the state shown in FIG. 18E, the spring 607 urges the shaft portion 502*c* of the main mirror holder 502, whereby the first contact portion 502*b* of the main mirror holder 502 is in contact with the positioning shaft 507. Further, the inner peripheral surface of the rectangular hole 604*c* of the mirror drive lever 604 is in contact with the drive shaft portion 504*c* of the sub mirror holder 504, whereby the sub mirror holder 504 continues the mirror-down operation. When mirror-down driving of the mirror drive unit 1000 progresses from the state shown in FIGS. 18A to 18E, the state shown in FIGS. 18A to 18E shifts to the mirror-down state shown in FIGS. 8A to 8E.

In FIGS. 8A to 8E, as described above, the mirror unit 500 is in the mirror-down position. In this state, as shown in FIG. 8B, the photo-interrupter 609 is released from the state shielded from light by the light shielding plate 603*f* of the cam gear 603, to enter the light-receiving state, and the photo-interrupter 610 is shielded from light by the light shielding plate 603*f* of the cam gear 603, thereby continuing to be in the non-light-receiving state. At this time, the MPU 100 determines via the mirror drive circuit that the mirror unit 500 has completed the mirror-up operation or the mirror-down operation, and terminates the mirror driving. In the state shown in FIG. 8C, the second gear portion 603*c* of the cam gear 603 and the gear portion 605*b* of the mirror drive gear 605 are not in mesh with each other.

Further, in the state shown in FIG. 8D, the first cam portion 603*d* of the cam gear 603 is in contact with the first follower portion 605*c* of the mirror drive gear 605. The first cam portion 603*d* of the cam gear 603 has a circular arc cam shape concentric with the part of the cam gear 603 without a cam lift. Therefore, even when the cam gear 603 is rotated to some degree in the cam area of the first cam portion 603*d* in this state, rotation is not transmitted to the mirror drive gear 605, so that the mirror drive gear 605 is not rotated.

Further, in this state, when the mirror drive gear 605 is in contact with the cam gear 603 receives an urging force in the mirror-up direction, the urging force acts in the direction substantially toward the center of rotation of the cam gear 603. Therefore, in the state shown in FIG. 8D, unless the cam gear 603 is rotated, the mirror drive gear 605 is restricted from rotating in the mirror-up direction. This causes the mirror unit 500 to be locked in the mirror-down position.

Further, the first contact portion 504b of the sub mirror holder 504 is brought into contact with the positioning shaft 508, and when the sub mirror holder 504 bounces, the sub mirror holder 504 is rotated about the support hole 504a in the mirror-up direction (counterclockwise direction as viewed in FIG. 8D). At this time, the drive shaft portion 504c of the sub mirror holder 504 charges the spring 608, and the bounce of the sub mirror holder 504 is suppressed.

As described above, in the present embodiment, the spring 607 which urges the main mirror holder 502 in the mirror-down state in the mirror-down direction is in contact with the spring urging portion 604e of the mirror drive lever 604 during rotation of the main mirror holder 502. On the other hand, the spring 607 is not in contact with the shaft portion 502c of the main mirror holder 502 during rotation of the main mirror holder 502. For this reason, the spring 607 is not charged during rotation of the main mirror holder 502. When the main mirror holder 502 reaches the mirror-down position, the spring 607 is brought into contact with the shaft portion 502c of the main mirror holder 502 and is charged, but the amount of charge of the spring 607 is small.

Further, during rotation of the sub mirror holder 504, the drive shaft portion 504c of the sub mirror holder 504 is brought into contact with the rectangular hole 604c of the mirror drive lever 604 in the mirror-down state of the main mirror holder 502. This causes the mirror drive lever unit 700 to rotate, and the amount of charge of the spring 608 is small during rotation of the sub mirror holder 504.

This makes it possible to reduce the amount of charge of the springs 607 and 608 which apply the urging forces during rotation of the mirror unit 500, and provide the mirror drive device that achieves lower torque during rotation of the mirror unit 500.

Next, a description will be given of states of the components of the mirror drive unit 1000 when the mirror unit 500 in the mirror-down state as shown in FIGS. 8A to 8E is externally forcibly pushed up e.g. by a user with his/her finger, with reference to FIGS. 19A to 19E.

Figure 19A:
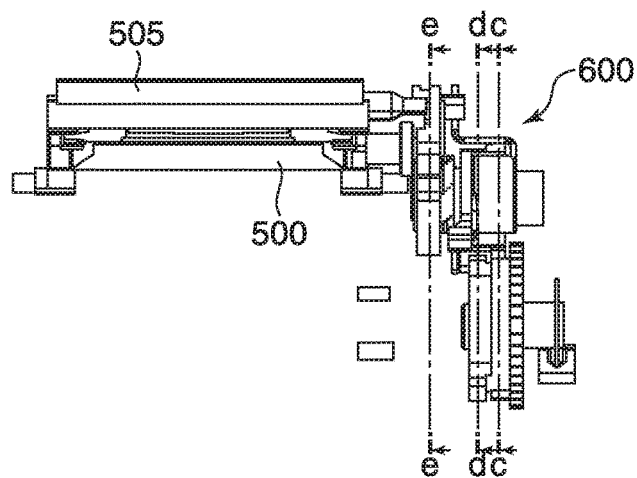
FIGS. 19A to 19E are views useful in explaining states of the components of the mirror drive unit when the mirror unit is externally forcibly pushed up from a mirror-down state.
Figure 19B:
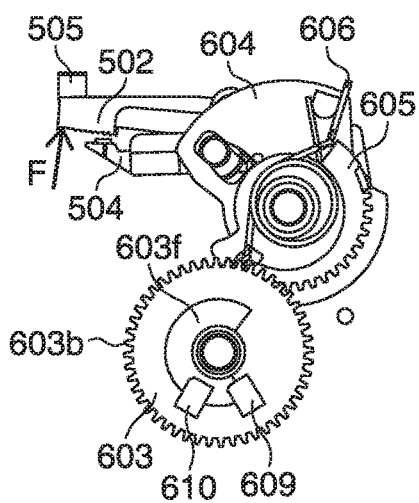

FIG. 19A is a front view showing a state in which the mirror unit 500 in the mirror-down state is externally forcibly pushed up. FIG. 19B is a right side view of FIG. 19A. FIG. 19B shows the relationship between the light shielding plate 603f of the cam gear 603 and the photo-interrupters 609 and 610 when the mirror unit 500 in the mirror-down state is externally forcibly pushed up.

In the state shown in FIG. 19B, similar to the state shown in FIG. 8B, the photo-interrupter 609 is in the light-receiving state, and the photo-interrupter 610 is shielded from light by the light shielding plate 603f of the cam gear 603, and hence is in the non-light-receiving state. At this time, as described above, the MPU 100 determines via the mirror drive circuit 101 that the mirror unit 500 has completed the mirror-up operation or the mirror-down operation, and terminates the mirror driving.

Figure 19C:
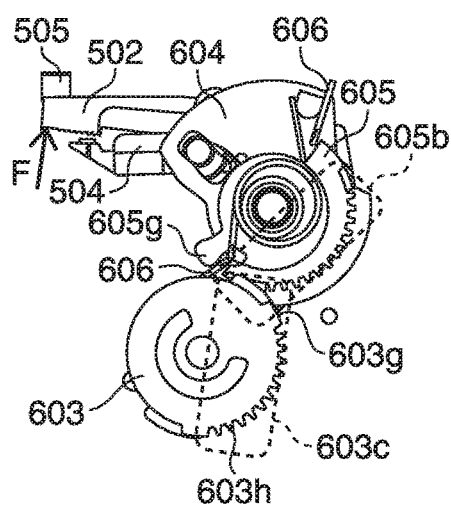

FIG. 19C is a cross-sectional view taken along c-c in FIG. 19A. FIG. 19C shows the relationship between the second gear portion 603c of the cam gear 603 and the gear portion 605b of the mirror drive gear 605, and the relationship between the mirror drive gear 605 and the mirror drive lever 604, when the mirror unit 500 is externally forcibly pushed up. In the state shown in FIG. 19C, the second gear portion 603c of the cam gear 603 and the gear portion 605b of the mirror drive gear 605 are not in mesh with each other.

Figure 19D:
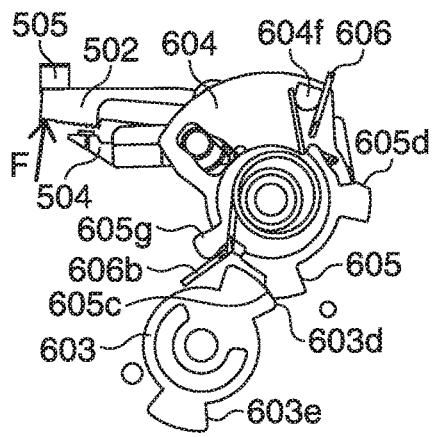

FIG. 19D is a cross-sectional view taken along d-d in FIG. 19A. FIG. 19D shows the relationship between the first cam portion 603d and the second cam portion 603e of the cam gear 603, and the first follower portion 605c and the second follower portion 605d of the mirror drive gear 605, when the mirror unit 500 is externally forcibly pushed up.

In the state shown in FIG. 19D, the first cam portion 603d of the cam gear 603 is in contact with the first follower portion 605c of the mirror drive gear 605. In this state, the mirror drive gear 605 is in contact with the cam gear 603, in a state urged in the mirror-up direction (clockwise direction as viewed in FIG. 19D). At this time, the mirror drive gear 605 is in contact with the cam gear 603 such that the urging force acts in the direction substantially toward the center of rotation of the cam gear 603. Therefore, the mirror drive gear 605 is not rotated in the mirror-up direction.

Figure 19E:
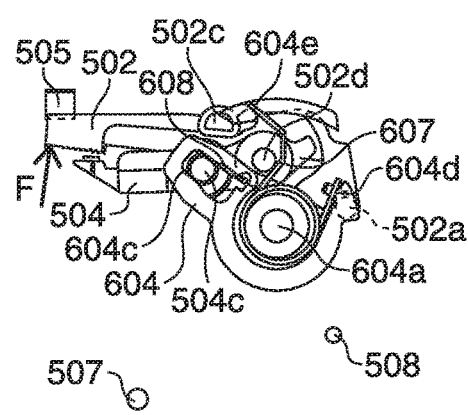

Further, the mirror drive lever 604 is rotated in the mirror-up direction with respect to the mirror drive gear 605 which is restricted from rotating as shown in FIG. 19E, referred to hereinafter. As described hereinabove, the one end 606a of the spring 606 is hooked on the spring urging portion 604f of the mirror drive lever 604, and the other end 606b of the spring 606 is hooked on the spring urging portion 605g of the mirror drive gear 605. Therefore, when the mirror drive lever 604 is rotated in the mirror-up direction with respect to the mirror drive gear 605, the spring 606 is charged in the mirror-up direction.

FIG. 19E is a cross-sectional view taken along e-e in FIG. 19A. FIG. 19E shows the relationship between the main mirror holder 502 and the sub mirror holder 504, and the mirror drive lever unit 700 (the mirror drive lever 604, the mirror drive gear 605, and the springs 607 and 608), when the mirror unit 500 is externally forcibly pushed up.

As shown in FIG. 19E, when the front end of the main mirror holder 502 is pushed up e.g. by a finger in a direction indicated by an arrow F, the main mirror holder 502 is rotated in the mirror-up direction. At this time, the sub mirror holder 504 is rotated in the mirror-up direction by being pulled up by the main mirror holder 502. Further, the drive shaft portion 504c of the sub mirror holder 504 and the inner peripheral surface of the rectangular hole 604c of the mirror drive lever 604 are brought into contact with each other, whereby the mirror drive lever 604 is also rotated in the mirror-up direction with respect to the mirror drive gear 605 which is restricted from rotating.

When the mirror unit 500 in the state shown in FIGS. 19A to 19E is released from the external force applied thereto, the mirror drive lever 604 rotated in the mirror-down direction by the returning force of the spring 606 which is charged in the mirror-up direction. When the mirror drive lever 604 is rotated in the mirror-down direction, the mirror unit 500 is also rotated in the mirror-down direction, thereby shifting to the mirror-down state shown FIGS. 8A to 8E.

As described above, even in the state in which the mirror drive gear 605 is restricted from rotating in the mirror-up direction, in the mirror-down state shown in FIGS. 8A to 8E, when the mirror unit 500 is externally pushed up, the mirror unit 500 can be rotated in the mirror-up direction.

As described above, in the present embodiment, the mirror drive lever unit 700 is locked by the cam gear 603 which transmits the driving force to the mirror drive lever unit 700, in the mirror-down position and in the mirror-up position of the mirror unit 500. This makes it possible to restrict the mirror unit 500 from rotating in the mirror-up direction and the mirror-down direction, when in the mirror-down position and in the mirror-up position, respectively. This eliminates the need of an additional driving source for releasing the mirror unit 500 from the locked state, and thereby makes it possible to provide the mirror drive device that achieves power saving, lower cost, and size reduction thereof.

Next, a description will be given of a camera as an image pickup apparatus equipped with a mirror drive device according to a second embodiment of the present invention, with reference to FIGS. 20A to 26E. Note that components corresponding to those of the first embodiment are described by denoting them using the same reference numerals.

FIG. 20A is a perspective view of the mirror drive lever unit 700, and FIG. 20B is an exploded perspective view of the mirror drive lever unit 700 shown in FIG. 20A.

As shown in FIGS. 20A and 20B, in the present embodiment, the mirror drive lever unit 700 includes not only the mirror drive lever 604, the mirror drive gear 605, and the springs 606 to 608, but also a contact lever 612. The mirror drive lever 604 and the contact lever 612 are attached to the mirror drive gear 605 in a manner rotatable about the second shaft portion 611b formed on the gear base 611b and fitted through the support hole 605a. The contact lever 612 corresponds to an example of a contact member.

Further, the mirror box 400 is formed with a hook portion 509 with which the spring 607 is brought into contact (see FIGS. 21B to 21E). Note that the hook portion 509 may be formed not in the mirror box 400 but on a fixed member, such as the gear base 611, which is fixed in the mirror box 400. The hook portion 509 corresponds to an example of a fourth hook portion.

Figure 21A:
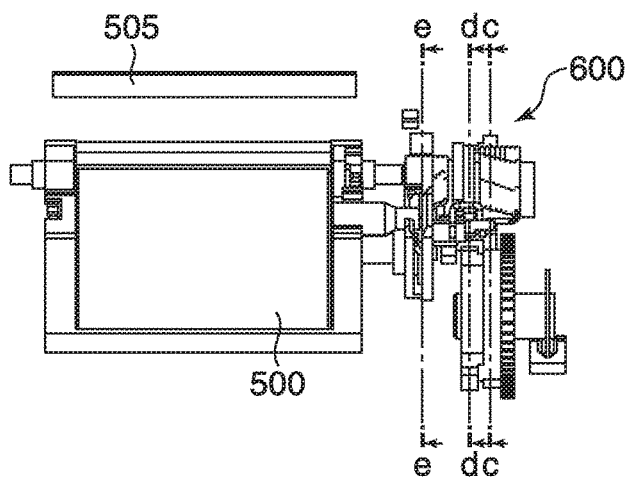
FIGS. 21A to 21E are views useful in explaining states of the components of the mirror drive unit when the mirror unit is in the mirror-down position.
Figure 21B:
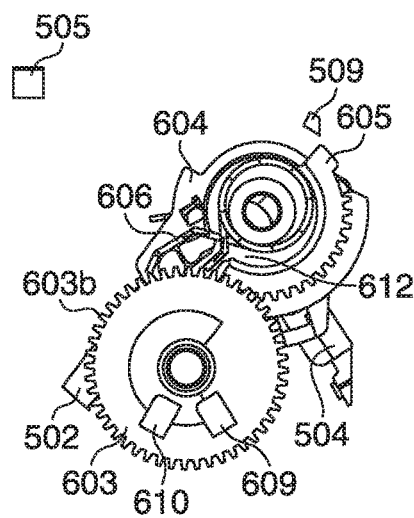

FIGS. 21A to 21E are views useful in explaining states of the components of the mirror drive unit 1000 when the mirror unit 500 is in the mirror-down position. FIG. 21A is a front view showing states of the components of the mirror drive unit 1000 when the mirror unit 500 in the mirror-down position, which corresponds to FIG. 8A in the first embodiment. FIG. 21B is a right side view of FIG. 21A. FIG. 21B shows the relationship between the light shielding plate 603f of the cam gear 603 and the photo-interrupters 609 and 610 when the mirror unit 500 is in the mirror-down position.

In the state shown in FIG. 21B, the photo-interrupter 609 is in the light-receiving state, and the photo-interrupter 610 is shielded from light by the light shielding plate 603f of the cam gear 603, thereby being in the non-light-receiving state. At this time, as described hereinabove, the MPU 100 determines via the mirror drive circuit 101 that the mirror unit 500 has completed the mirror-up operation or the mirror-down operation, and has terminated the mirror driving.

Figure 21C:
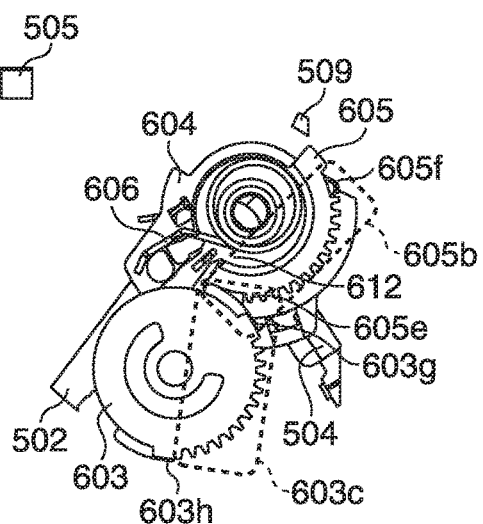

FIG. 21C is a cross-sectional view taken along c-c in FIG. 21A. FIG. 21C shows the relationship between the second gear portion 603c of the cam gear 603 and the gear portion 605b of the mirror drive gear 605 when the mirror unit 500 is in the mirror-down position. In the state shown in FIG. 21C, the second gear portion 603c of the cam gear 603 and the gear portion 605b of the mirror drive gear 605 are not in mesh with each other.

Figure 21D:
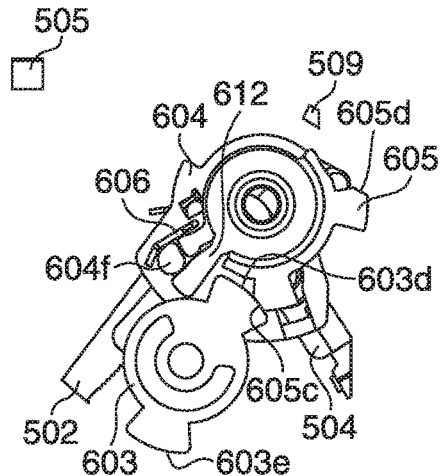

FIG. 21D is a cross-sectional view taken along d-d in FIG. 21A. FIG. 21D shows the relationship between the first cam portion 603d and the second cam portion 603e of the cam gear 603, and the first follower portion 605c and the second follower portion 605d of the mirror drive gear 605, when the mirror unit 500 is in the mirror-down position.

In the state shown in FIG. 21D, the first cam portion 603d of the cam gear 603 is in contact with the first follower portion 605c of the mirror drive gear 605. The first cam portion 603d of the cam gear 603 has a circular arc cam shape concentric with the part of the cam gear 603 without a cam lift. Therefore, even when the cam gear 603 is rotated to some degree in the cam area of the first cam portion 603d in this state, rotation is not transmitted to the mirror drive gear 605, so that the mirror drive gear 605 is not rotated.

Figure 21E:
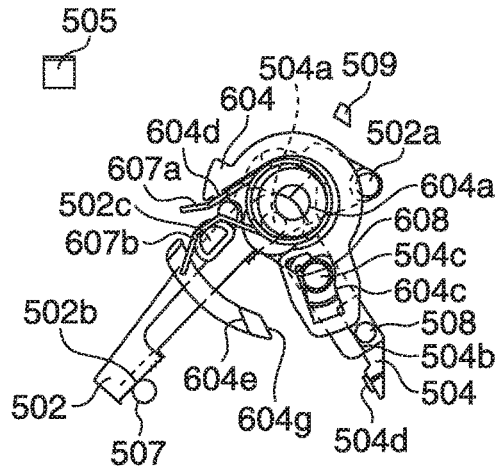

FIG. 21E is a cross-sectional view taken along e-e in FIG. 21A. FIG. 21E shows the relationship between the main mirror holder 502 and the sub mirror holder 504, and the mirror drive lever unit 700 (the mirror drive lever 604, the mirror drive gear 605, and the springs 607 and 608), when the mirror unit 500 is in the mirror-down position.

In the state shown in FIG. 21E, the spring 607 urges the shaft portion 502c of the main mirror holder 502 in the mirror-down direction, whereby the first contact portion 502b of the main mirror holder 502 is brought into contact with positioning shaft 507. Further, the spring 608 urges the drive shaft portion 504c of the sub mirror holder 504 in the mirror-down direction, whereby the first contact portion 504b of the sub mirror holder 504 is brought into contact with the positioning shaft 508. In this state, the inner peripheral surface of the rectangular hole 604c of the mirror drive lever 604 is not in contact with the drive shaft portion 504c of the sub mirror holder 504.

Figure 22:
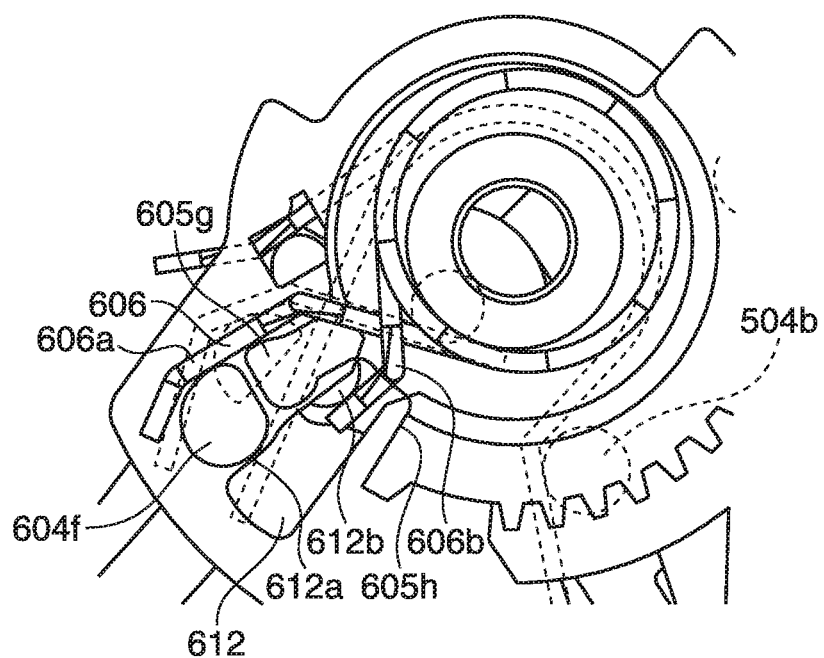
FIG. 22 is an enlarged view useful in explaining states of the components of the mirror lever drive unit when the mirror unit is in the mirror-down position.

FIG. 22 is an enlarged view useful in explaining states of components of the mirror drive lever unit 700 when the mirror unit 500 is in the mirror-down position. In the states shown in FIG. 22, the spring 606 has the one end 606a thereof brought into contact with the spring urging portion 604f of the mirror drive lever 604, and has the other end 606b thereof brought into contact with a spring urging portion 612b of the contact lever 612. With this, the mirror drive lever 604 is urged in the mirror-down direction, and the contact lever 612 is urged in the mirror-up direction. The spring urging portion 604f corresponds to an example of a fifth hook portion.

Here, the mirror drive lever 604 is also urged in the mirror-up direction by the reaction forces of the springs 607 and 608. However, the urging force of the spring 606 is sufficiently larger than the reaction forces of the springs 607 and 608, and hence the mirror drive lever 604 is urged in the mirror-down direction.

A contact portion 612a of the contact lever 612 is brought into contact with the spring urging portion 604f of the mirror drive lever 604 urged in the mirror-down direction. As mentioned above, the contact lever 612 is urged in the mirror-up direction (clockwise direction as viewed in FIG. 22) by the spring 606. For this reason, the contact portion 612a of the contact lever 612 is also brought into contact with the spring urging portion 605g of the mirror drive gear 605.

At this time, similar to the first embodiment, the mirror drive gear 605 is urged to rotate in the mirror-up direction (clockwise direction as viewed in FIG. 22) by the reaction forces of the springs 607 and 608. This brings the first follower portion 605c of the mirror drive gear 605 into contact with the first cam portion 603d of the cam gear 603.

When the motor 601 is rotated in the mirror-up direction (counterclockwise direction as viewed from the pinion 602) in the state shown in FIGS. 21A to 21E and FIG. 22, similar to the first embodiment, the mirror drive unit 1000 starts mirror-up driving.

Figure 23A:
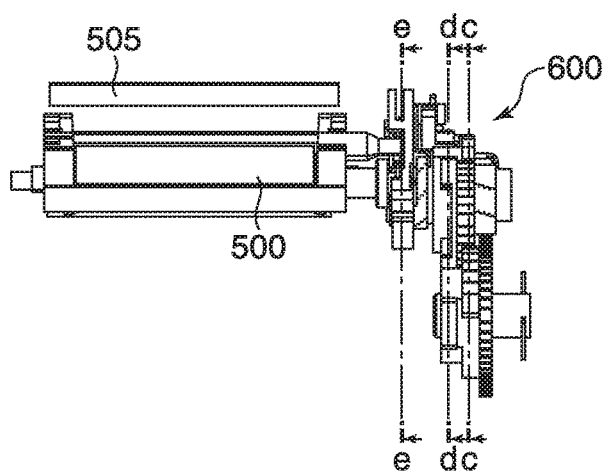
FIGS. 23A to 23E are views useful in explaining states of the components of the mirror drive unit before the mirror unit reaches the mirror-up position.
Figure 23B:
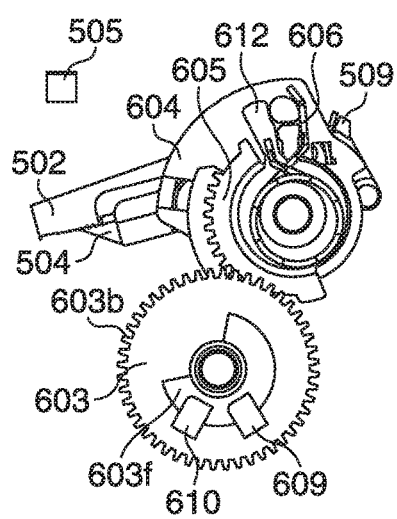

FIGS. 23A to 23E are views useful in explaining states of the components of the mirror unit drive unit 1000 before the mirror unit 500 reaches the mirror-up position. FIG. 23A is a front view showing a state before the mirror unit 500 reaches the mirror-up position, which corresponds to FIG. 21A. FIG. 23B is a right side view of FIG. 23A. FIG. 23B shows the relationship between the light shielding plate 603f of the cam gear 603 and the photo-interrupters 609 and 610 before the mirror unit 500 reaches the mirror-up position.

In the state shown in FIG. 23B, the photo-interrupter 609 is changed from the light-receiving state to the non-light-receiving state by the light shielding plate 603f of the cam gear 603, and the photo-interrupter 610 is shielded from light by the light shielding plate 603f of the cam gear 603, thereby continuing to be in the non-light-receiving state.

When the photo-interrupter 609 is changed from the light-receiving state to the non-light-receiving state, the MPU 100 determines, as described hereinabove, via the mirror drive circuit 101 that the mirror unit 500 has not completed the mirror-down operation or the mirror-up operation.

Figure 23C:
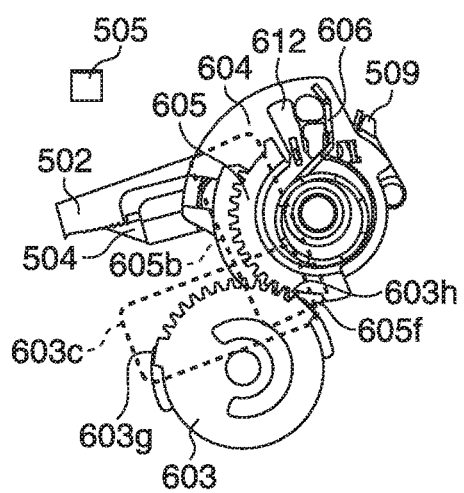

FIG. 23C is a cross-sectional view taken along c-c in FIG. 23A. FIG. 23C shows the relationship between the second gear portion 603c of the cam gear 603 and the gear portion 605b of the mirror drive gear 605 before the mirror unit 500 reaches the mirror-up position. In the state shown in FIG. 23C, the second gear portion 603c of the cam gear 603 and the gear portion 605b of the mirror drive gear 605 are in mesh with each other.

Figure 23D:
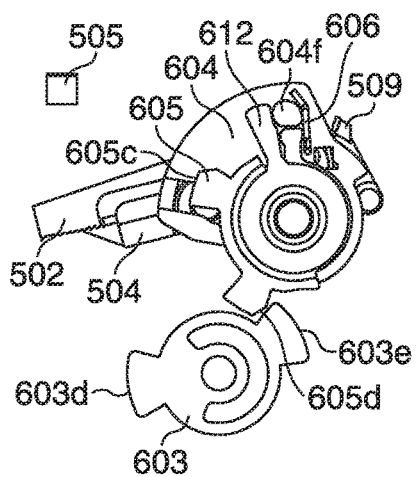

FIG. 23D is a cross-sectional view taken along d-d in FIG. 23A. FIG. 23D shows the relationship between the first cam portion 603d and the second cam portion 603e of the cam gear 603, and the first follower portion 605c and the second follower portion 605d of the mirror drive gear 605, before the mirror unit 500 reaches the mirror-up position.

In the state shown in FIG. 23D, the first cam portion 603d of the earn gear 603 is not in contact with the first follower portion 605c of the mirror drive gear 605. Further, the second cam portion 603e of the cam gear 603 is not in contact with the second follower portion 605d of the mirror drive gear 605.

Figure 23E:
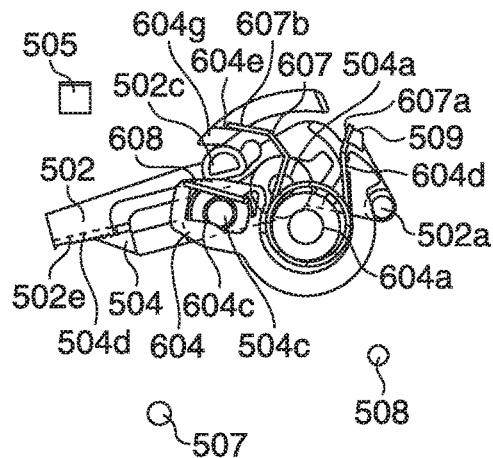

FIG. 23E is a cross-sectional view taken along e-e in FIG. 23A. FIG. 23E shows the relationship between the main mirror holder 502 and the sub mirror holder 504, and the mirror drive lever unit 700 (the mirror drive lever 604, the mirror drive gear 605, and the springs 607 and 608), before the mirror unit 500 reaches the mirror-up position.

In the state shown in FIG. 23E, the drive shaft portion 501c of the sub mirror holder 504 is brought into contact with the inner peripheral surface of the rectangular hole 604c of the mirror drive lever 604, and the sub mirror holder 504 performs the mirror-up operation. Further, the second contact portion 504d of the sub mirror holder 504 and the second contact portion 502e of the main mirror holder 502 are brought into contact with each other. With this, the main mirror holder 502 performs the mirror-up operation by being pushed up by the sub mirror holder 501.

At this time, the spring 607 is in a state in which the one end, denoted by reference numeral 607a, is in contact with the hook portion 509, and is not longer in contact with the spring urging portion 604d of the mirror drive lever 604, and the other end, denoted by reference numeral 607b, is in contact with the spring urging portion 604e of the mirror drive lever 604. When the mirror drive lever unit 700 is rotated in the mirror-up direction in this state, the spring 607 is charged in the mirror-up direction.

As a result, the mirror drive lever unit 700 is urged in the mirror-down direction by the returning force of the spring 607, and this force acts in a direction of canceling inertia of the mirror unit. 500 and the mirror drive lever 604. This makes it possible to reduce the speed of the mirror unit 500 before the mirror unit 500 reaches the mirror-up position, and thereby reduce the impact applied when the mirror unit 500 reaches the mirror-up position. When mirror-up driving by the mirror drive unit 1000 progresses from the state shown in FIGS. 23A to 23E, the state shown in FIGS. 23A to 23E shifts to a state shown in FIGS. 24A to 24E.

Figure 24A:
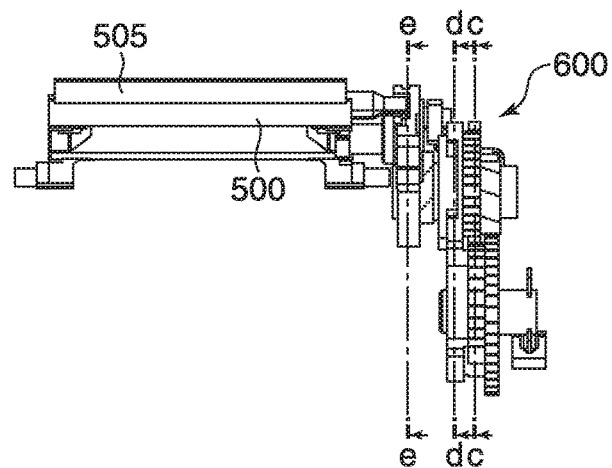
FIGS. 24A to 24E are views useful in explaining states of the components of the mirror drive unit when the mirror unit is in the mirror-up position.
Figure 24B:
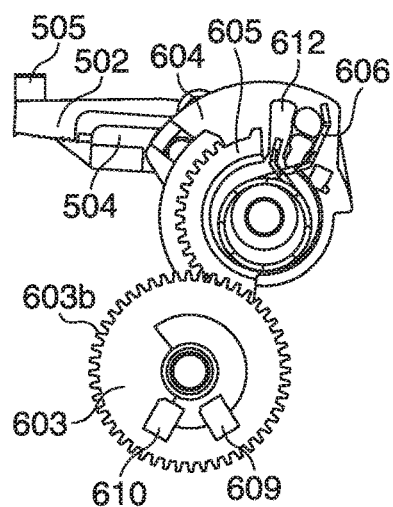

FIGS. 24A to 24E are views useful in explaining states of the components of the mirror drive unit 1000 when the mirror unit 500 is in the mirror-up position. FIG. 24A is a front view showing a state when the mirror unit 500 is in the mirror-up position, which corresponds to FIG. 21A. FIG. 24B is a right side view of FIG. 24A. FIG. 24B shows the relationship between the light shielding plate 603f of the cam gear 603 and the photo-interrupters 609 and 610 when the mirror unit 500 is in the mirror-up position.

In the state shown in FIG. 24B, the cam gear 603 is further rotated in the counterclockwise direction from the state shown in FIGS. 23A to 23G. In this state, the photo-interrupter 609 is shielded from light by the light shielding plate 603f of the cam gear 603, thereby continuing to be in the non-light-receiving state, and the photo-interrupter 610 is released from the state shielded by the light shielding plate 603f of the cam gear 603, thereby entering the light-receiving state. At this time, as described hereinabove, the MPU 100 determines via the mirror drive circuit 101 that the mirror unit 500 has completed the mirror-up operation or the mirror-down operation, and terminates the mirror driving.

Figure 24C:
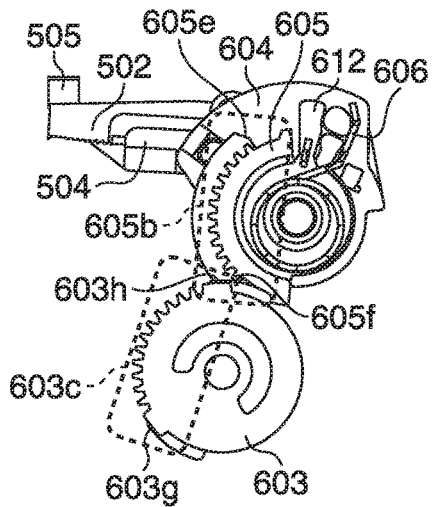

FIG. 24C is a cross-sectional view taken along c-c in FIG. 24A. FIG. 24C shows the relationship between the second gear portion 603c of the cam gear 603 and the gear portion 605b of the mirror drive gear 605 when the mirror unit 500 is in the mirror-up position. In the state shown in FIG. 24C, the second gear portion 603c of the cam gear 603 and the gear portion 605b of the mirror drive gear 605 are not in mesh with each other.

Figure 24D:
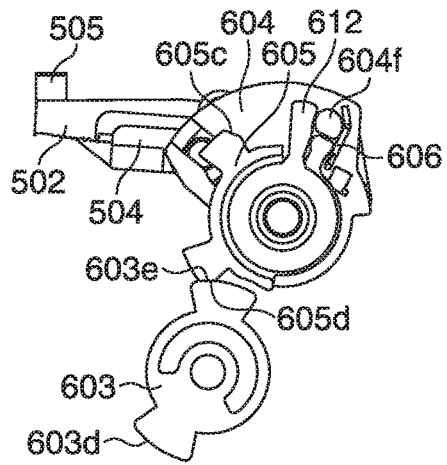

FIG. 24D is a cross-sectional view taken along d-d in FIG. 24A. FIG. 24D shows the relationship between the first cam portion 603d and the second cam portion 603e of the cam gear 603, and the first follower portion 605c and the second follower portion 605d of the mirror drive gear 605, when the mirror unit 500 is in the mirror-up position.

In the state shown in FIG. 24D, the second follower portion 605d of the mirror drive gear 605 is in contact with the second cam portion 603e of the cam gear 603, in a state urged toward the center of rotation of the cam gear 603. Here, the second cam portion 603e of the cam gear 603 has a circular arc cam shape concentric with the part of the cam gear 603 without a cam lift. Therefore, even when the cam gear 603 is rotated to some degree in the cam area of the second cam portion 603e in this state, rotation is not transmitted to the mirror drive gear 605, so that the mirror drive gear 605 is not rotated.

Figure 24E:
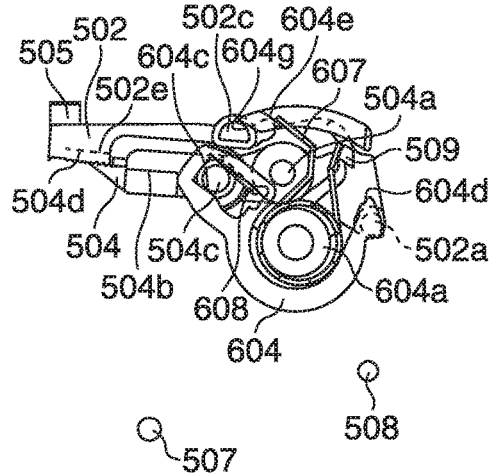

FIG. 24E is a cross-sectional view taken along e-e in FIG. 24A. FIG. 24E shows the relationship between the main mirror holder 502 and the sub mirror holder 504, and the mirror drive lever unit 700 (the mirror drive lever 604, the mirror drive gear 605, and the springs 607 and 608), when the mirror unit 500 is in the mirror-up position.

In the state shown in FIG. 24E, the drive shaft portion 504c of the sub mirror holder 504 is in contact with the inner peripheral surface of the rectangular hole 604c of the mirror drive lever 604, and the second contact portion 504d of the sub mirror holder 504 is in contact with the second contact portion 502e of the main mirror holder 502.

Figure 25:
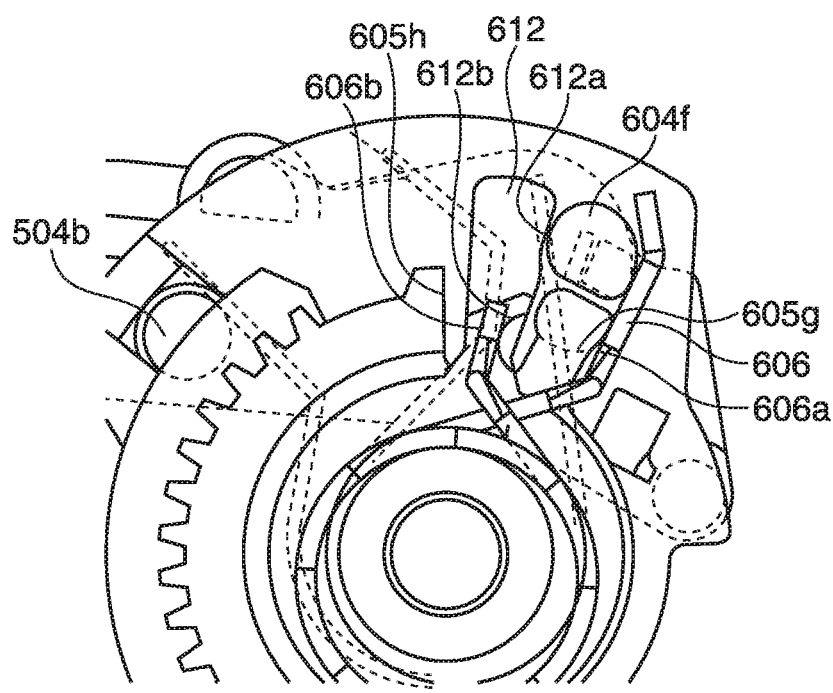
FIG. 25 is an enlarged view useful in explaining states of the components of the mirror lever drive unit when the mirror unit is in the mirror-up position.

FIG. 25 is an enlarged view useful in explaining states of the mirror drive lever unit 700 when the mirror unit 500 is in the mirror-up position. In the state shown in FIG. 25, the spring 606 is in a state in which the one end 606a thereof is not in contact with the spring urging portion 604f of the mirror drive lever 604 but is in contact with the spring urging portion 605g of the mirror drive gear 605, and the other end 606b thereof is in contact with the spring urging portion 612b of the contact lever 612. With this, the mirror drive gear 605 is urged in the mirror-down direction (counterclockwise direction as viewed in FIG. 25), and the contact lever 612 is urged in the mirror-up direction.

Further, the drive shaft portion 504c of the sub mirror holder 504 is brought into contact with the inner peripheral surface of the rectangular hole 604c of the mirror drive lever 604, whereby the mirror drive lever 604 is urged in the mirror-down direction. The mirror drive lever 604 urged in the mirror-down direction is rotated together with the contact lever 612 in the mirror-down direction with respect to the mirror drive gear 605.

At this time, the spring urging portion 604f of the mirror drive lever 604 continues to be in the state in contact with the contact portion 612a of the contact lever 612. The contact lever 612 rotated in the mirror-down direction has the spring urging portion 612b thereof brought into contact with the other end 606b of the spring 606, thereby charging the spring 606. In this state, the mirror unit 500 is urged in the mirror-up direction by the returning force of the spring 606.

The mirror drive gear 605 is further formed with a contact portion 605h. When the contact lever 612 is largely rotated together with the mirror drive lever 604 in the mirror-down direction with respect to the mirror drive gear 605, the contact lever 612 is brought into contact with the contact portion 605h of the mirror drive gear 605. With this, the contact lever 612 is restricted from rotating in the mirror-down direction, whereby it is possible to suppress the bounce of the mirror unit 500 in the mirror-up driving.

In the mirror drive unit 1000, similar to the first embodiment, during the mirror-down operation, the mirror drive lever unit 700 is rotated in an opposite direction to the direction of rotation in the mirror-up operation. At this time, the mirror drive lever unit 700 receives a force in the mirror-down direction due to the returning force of the spring 607 which has been charged, at the start of the mirror-down operation, and hence it is possible to promote acceleration of the mirror unit 500 at the start of the mirror-down operation.

As described above, in the present embodiment, when the mirror drive unit 1000 is in the mirror-down position, the phase of the mirror drive lever 604 with respect to the mirror drive gear 605 is accurately determined without being influenced by variation in the dimensions of the shape of the spring 606 and changes in the shape of the same caused by ambient temperature and the like. Therefore, it is possible to stabilize the phase of the mirror drive lever 604 in the mirror-down position. This stabilizes the urging forces applied to the main mirror holder 502 and the sub mirror holder 504, and hence it is possible to make more stable the waiting positions of the main mirror 501 and the sub mirror 503 in the mirror-down operation.

Further, in the mirror-up position, it is possible to urge the mirror drive lever 604 in the mirror-up direction. As a result, the sub mirror holder 504 is urged in the mirror-up direction, and hence it is possible to stabilize the waiting position of the mirror unit 500 in the mirror-up position at a location more distant from the optical axis.

Next, a description will be given of states of the components of the mirror drive unit 1000 when the mirror unit 500 is externally forcibly pushed up e.g. in a case where a user pushes up the main mirror holder 502 with his/her finger to visually check the focal plane shutter 106 in the mirror-down state, shown in FIGS. 21A to 21E, with reference to FIGS. 26A to 26E.

Figure 26A:
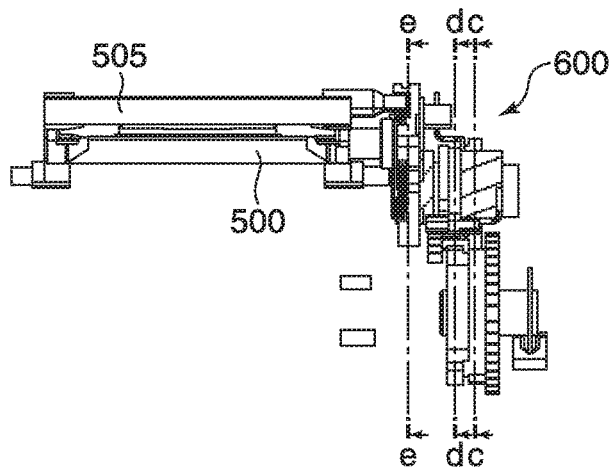
FIGS. 26A to 26E are views useful in explaining states of the components of the mirror drive unit when the mirror unit is externally forcibly pushed up from the mirror-down state.
Figure 26B:
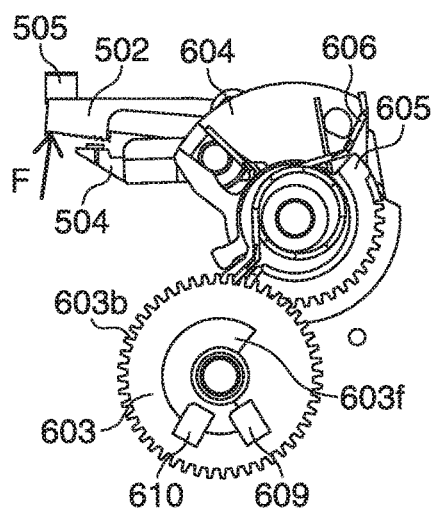

FIG. 26A is a front view useful in explaining states of the components of the mirror drive unit 1000 when the mirror unit 500 in the mirror-down state is externally forcibly pushed up. FIG. 26B is a right side view of FIG. 26A. FIG. 26B shows the relationship between the light shielding plate 603f of the cam gear 603 and the photo-interrupters 609 and 610 when the mirror unit 500 is externally forcibly pushed up.

In the state shown in FIG. 26B, the photo-interrupter 609 is in the light-receiving state, and the photo-interrupter 610 is shielded from light by the light shielding plate 603f of the cam gear 603, thereby being in the non-light-receiving state. At this time, as described hereinabove, the MPU 100 determines via the mirror drive circuit 101 that the mirror unit 500 has completed the mirror-down operation, and terminates the mirror driving.

Figure 26C:
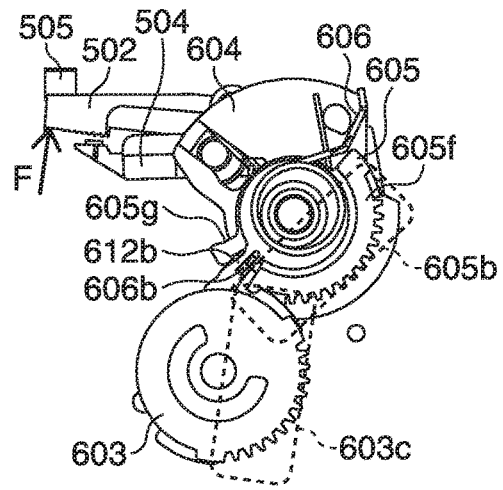

FIG. 26C is a cross-sectional view taken along c-c in FIG. 26A. FIG. 26C shows the relationship between the second gear portion 603c of the cam gear 603 and the gear portion 605b of the mirror drive gear 605 and the relationship between the mirror drive gear 605 and the mirror drive lever 604, when the mirror unit 500 is externally forcibly pushed up. In the state shown in FIG. 26C, the second gear portion 603c of the cam gear 603 and the gear portion 605b of the mirror drive gear 605 are not in mesh with each other.

Figure 26D:
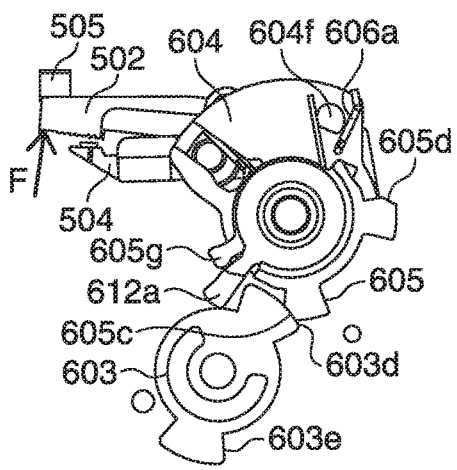

FIG. 26D is a cross-sectional view taken along d-d in FIG. 26A. FIG. 26D shows the relationship between the first cam portion 603d and the second cam portion 603e of the cam gear 603, and the first follower portion 605c and the second follower portion 605d of the mirror drive gear 605, when the mirror unit 500 is externally forcibly pushed up.

In the state shown in FIG. 26D, the first cam portion 603d of the cam gear 603 and the first follower portion 605c of the mirror drive gear 605 are in contact with each other. In this state, the mirror drive gear 605 is brought into contact with the cam gear 603, in a state urged in the mirror-up direction. At this time, the mirror drive gear 605 is brought into contact with the cam gear 603 such that the urging force acts in the direction substantially toward the center of rotation of the cam gear 603. Therefore, in this state, the mirror drive gear 605 is not rotated in the mirror-up direction.

Further, in this state, the one end 606a of the spring 606 is in contact with the spring urging portion 604f of the mirror drive lever 604, and the other end 606b of the same is in contact with the spring urging portion 612b of the contact lever 612. Further, the contact lever 612 urged in the mirror-up direction is brought into contact with the spring urging portion 605g of the mirror drive gear 605. This restricts the contact lever 612 from rotating in the mirror-up direction, and hence the spring 606 is charged.

Figure 26E:
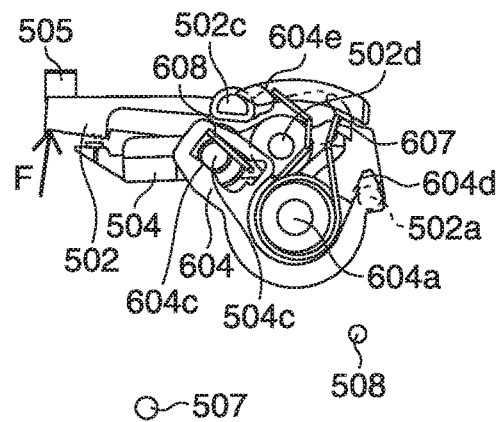

FIG. 26E is a cross-sectional view taken along e-e in FIG. 26A. FIG. 26E shows the state of the main mirror holder 502 and the sub mirror holder 504, and the mirror drive lever unit 700 (the mirror drive lever 604, the mirror drive gear 605, and the springs 607 and 608), when the mirror unit 500 is externally forcibly pushed up.

As shown in FIG. 26E, when the front end of the main mirror holder 502 is pushed up e.g. by a finger in a direction indicated by an arrow F, the main mirror holder 502 is rotated in the mirror-up direction. At this time, the sub mirror holder 504 is rotated in the mirror-up direction by being pulled up by the main mirror holder 502. Further, the drive shaft portion 504c of the sub mirror holder 504 and the inner peripheral surface of the rectangular hole 604c of the mirror drive lever 604 are brought into contact with each other, whereby the mirror drive lever 604 is also rotated in the mirror-up direction.

When the mirror unit 500 in the state shown FIGS. 26A to 26E is released from the external force applied thereto, the mirror drive lever 604 is rotated in the mirror-down direction by the returning force of the charged spring 606. When the mirror drive lever 604 is rotated in the mirror-down direction, the mirror unit 500 is also rotated in the mirror-down direction, thereby shifting to the mirror-down state shown in FIGS. 21A to 21E.

As described above, in the present embodiment, even in a state in which the mirror drive gear 605 is restricted from rotating in the mirror-up direction, when the mirror unit 500 is externally pushed up, the mirror unit 500 can be rotated in the mirror-up direction. This enables the user to easily visually check the focal plane shutter 106 or the like.

Further, in the present embodiment, during the mirror-up operation, the mirror drive lever unit 700 is urged in the mirror-down direction by the returning force of the spring 607, and this force acts in a direction of canceling inertia of the mirror unit 500 and the mirror drive lever 604. This makes it possible to reduce the speed of the mirror unit 500 before the mirror unit 500 reaches the mirror-up position, and thereby reduce the impact applied when the mirror unit 500 reaches the mirror-up position and the duration of the bounce of the mirror in the mirror-up driving. The other configurations and the advantageous effects are the same as those of the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-242912 filed Dec. 14, 2015 and No. 2015-242913, filed Dec. 14, 2015, which are hereby incorporated by reference herein in their entirety.

What is claimed is:

1. A mirror drive device comprising:
   a first mirror holder that holds a first mirror and is configured to be movable between a first position in a photographing optical path and a second position retracted from the photographing optical path;
   a second mirror holder that holds a second mirror in a state rotatably attached to said first mirror holder and is configured to be movable between a third position in the photographing optical path and a fourth position retracted from the photographing optical path;
   a motor;
   a first driving member configured to be driven by said motor; and
   a second driving member configured to move said second mirror holder between the third position and the fourth position,
   wherein when said first mirror holder is in the first position, and said second mirror holder is in the third position, said first driving member and said second driving member are connected by cams provided on said first driving member and said second driving member, respectively, to thereby restrict movement of said second driving member,
   wherein when said first mirror holder is in a position between the first position and the second position, and when said second mirror holder is a position between the third position and the fourth position, said first driving member and said second driving member are connected by gears provided on said first driving member and said second driving member, respectively, to thereby enable said second driving member to move said second mirror holder, and
   wherein when said second mirror holder is moved from the third position to the fourth position, said second mirror holder is brought into contact with said first mirror holder, whereby said first mirror holder is pushed by said second mirror holder, thereby being moved from the first position to the second position.

2. The mirror drive device according to claim 1, wherein when said first mirror holder is in the second position, and said second mirror holder is in the fourth position, said first driving member and said second driving member are connected by said cams, to thereby restrict the movement of said second driving member.

3. The mirror drive device according to claim 1, wherein when said first mirror holder is in the first position, and said second mirror holder is in the third position, said first driving member and said second driving member are connected by cam areas, having no cam lift, of said cams.

4. The mirror drive device according to claim 1, wherein said second driving member includes an engagement member that is engaged with said second mirror holder, a connection member that is connected to said first driving member via said cams or said gears, and a first urging member that urges part of said connection member and part of said engagement member in a sandwiching manner.

5. The mirror drive device according to claim 1, wherein said second driving member includes an engagement member that is engaged with said second mirror holder, a connection member that is connected to said first driving member via said cams or said gears, a contact member that is brought into contact with said engagement member and said connection member, and a first urging member having one end hooked on said engagement member and said connection member, and another end hooked on said contact member.

6. The mirror drive device according to claim 5, wherein in said second driving member, when said first mirror holder is in the first position, and said second mirror holder is in the third position, said one end of said first urging member urges said engagement member toward said contact member, and said other end of said first urging member urges said contact member toward said engagement member, whereby said contact member is in contact with said engagement member and said connection member, and
   wherein when said first mirror holder is in the second position, and said second mirror holder is in the fourth position, said second driving member drives said engagement member against an urging force of said first urging member such that said one end of said first urging member does not urge said engagement member, and said contact member and said connection member are not brought into contact with each other.

7. The mirror drive device according to claim 1, wherein said second driving member includes a second urging member that urges said first mirror holder toward the first position, and a third urging member that urges said second mirror holder toward the third position.

8. A mirror drive device comprising:
   a first mirror holder that holds a first mirror and is configured to be movable between a first position in a photographing optical path and a second position retracted from the photographing optical path;
   a first urging member configured to urge said first mirror holder in a direction toward the first position;
   a second mirror holder that holds a second mirror in a state rotatably attached to said first mirror holder and is configured to be movable between a third position in the photographing optical path and a fourth position retracted from the photographing optical path;
   a motor; and a driving member configured to be driven by said motor to move said second mirror holder between the third position and the fourth position, wherein when said first mirror holder is in the first position, and said second mirror holder is in the third position, one end of said first urging member is hooked on a first hook portion formed on said first mirror holder, and another end of said first urging member is hooked on a second hook portion formed on said driving member, and wherein when said first mirror holder is in the first position, and said second mirror holder is moved from the third position toward the fourth position, to enter a state overlaid on said first mirror holder, said one end of said first urging member is hooked on a third hook portion formed on said driving member, and said other end of said first urging member is hooked on said second hook portion.

9. The mirror drive device according to claim 8, wherein during movement of said first mirror holder from the first position to the second position in a state in which said first mirror holder and said second mirror holder are overlaid upon each other, said one end of said first urging member is hooked on said third hook portion, and said other end of said first urging member is hooked on a fourth hook portion provided in a mirror box to which said first mirror holder is attached in a rotatable manner.

10. The mirror drive device according to claim 8, further comprising a second urging member configured to urge said second mirror holder in a direction toward the third position, and wherein one end of said second urging member is hooked on a fifth hook portion formed on said driving member, and another end of said second urging member is hooked on a sixth hook portion formed on said second mirror holder, wherein when said second mirror holder is in the third position, said second mirror holder is urged by said second urging member, thereby being brought into contact with a position adjustment member provided in a mirror box to which said first mirror holder is attached in a rotatable manner, and wherein during movement of said second mirror holder from the third position to the fourth position, said second mirror holder is urged in a direction toward the third position by said second urging member.

11. The mirror drive device according to claim 10, wherein when said second mirror holder is moved from the third position to the fourth position by said driving member, the mirror drive device has a first region in which said second mirror holder is moved without said first mirror holder being moved, and a second region in which said first mirror holder and said second mirror holder are both moved, and wherein said second mirror holder is urged in a direction toward the third position by said second urging member in the first region.

12. An image pickup apparatus comprising:
a first mirror holder that holds a first mirror and is configured to be movable between a first position in a photographing optical path and a second position retracted from the photographing optical path;
a second mirror holder that holds a second mirror in a state rotatably attached to said first mirror holder and is configured to be movable between a third position in the photographing optical path and a fourth position retracted from the photographing optical path;
a motor;
a first driving member configured to be driven by said motor; and
a second driving member configured to move said second mirror holder between the third position and the fourth position, wherein when said first mirror holder is in the first position, and said second mirror holder is in the third position, said first driving member and said second driving member are connected by cams provided on said first driving member and said second driving member, respectively, to thereby restrict movement of said second driving member, wherein when said first mirror holder is in a position between the first position and the second position, and when said second mirror holder is in a position between the third position and the fourth position, said first driving member and said second driving member are connected by gears provided on said first driving member and said second driving member, respectively, to thereby enable said second driving member to move said second mirror holder, and wherein when said second mirror holder is moved from the third position to the fourth position, said second mirror holder is brought into contact with said first mirror holder, whereby said first mirror holder is pushed by said second mirror holder, thereby being moved from the first position to the second position.

13. An image pickup apparatus comprising:
a first mirror holder that holds a first mirror and is configured to be movable between a first position in a photographing optical path and a second position retracted from the photographing optical path;
a first urging member configured to urge said first mirror holder in a direction toward the first position;
a second mirror holder that holds a second mirror in a state rotatably attached to said first mirror holder and is configured to be movable between a third position in the photographing optical path and a fourth position retracted from the photographing optical path;
a motor; and
a driving member configured to be driven by said motor to move said second mirror holder between the third position and the fourth position, wherein when said first mirror holder is in the first position, and said second mirror holder is in the third position, one end of said first urging member is hooked on a first hook portion formed on said first mirror holder, and another end of said first urging member is hooked on a second hook portion formed on said driving member, and wherein when said first mirror holder is in the first position, and said second mirror holder is moved from the third position toward the fourth position, to enter a state overlaid on said first mirror holder, said one end of said first urging member is hooked on a third hook portion formed on said driving member, and said other end of said first urging member is hooked on said second hook portion.

* * * * *